(12) United States Patent
Lu et al.

(10) Patent No.: US 11,906,085 B1
(45) Date of Patent: Feb. 20, 2024

(54) QUICK-FITTING PIPE FITTING

(71) Applicant: SHANGHAI VISION MECHANICAL JOINT CO., LTD, Shanghai (CN)

(72) Inventors: Zhigang Lu, Shanghai (CN); Zhibing Zhai, Shanghai (CN); Xubin Lu, Shanghai (CN); Jun Wu, Shanghai (CN)

(73) Assignee: SHANGHAI VISION MECHANICAL JOINT CO., LTD, Shanghai (CN)

( * ) Notice: Subject to any disclaimer, the term of this patent is extended or adjusted under 35 U.S.C. 154(b) by 0 days.

(21) Appl. No.: 18/197,900

(22) Filed: May 16, 2023

(30) Foreign Application Priority Data

Sep. 17, 2022 (CN) .......................... 202211132595.7

(51) Int. Cl.
*F16L 23/08* (2006.01)

(52) U.S. Cl.
CPC .................................. *F16L 23/08* (2013.01)

(58) Field of Classification Search
CPC ..... F16L 21/022; F16L 21/007; F16L 21/065; F16L 23/08; F16L 23/10; F16L 23/04; F16L 23/16; F16L 23/18; F16L 23/22; F16L 55/172; F16L 55/178; F16L 25/04; F16L 17/04
USPC .................................................. 285/411, 410
See application file for complete search history.

(56) References Cited

U.S. PATENT DOCUMENTS

2019/0032824 A1* 1/2019 McNamara ............. F16L 17/04

* cited by examiner

*Primary Examiner* — Aaron M Dunwoody
(74) *Attorney, Agent, or Firm* — COOPER LEGAL GROUP, LLC

(57) ABSTRACT

A quick-fitting pipe fitting for connecting at least one pipeline element comprises a pipe fitting body. The pipe fitting body is configured with a pre-installation section, and the pre-installation section is movably connected with a pipe clamp assembly. The pipe clamp assembly comprises at least two movable clamp parts and at least one fastener, and the fastener is configured to be operated to fasten the two movable clamp parts. At least one sealing ring is arranged in the pipe clamp assembly.

18 Claims, 30 Drawing Sheets

QUICK-FITTING PIPE FITTING

CROSS-REFERENCE TO RELATED APPLICATION

This application claims the priority and benefit of Chinese patent application serial no. 202211132595.7, filed on Sep. 17, 2022. The entirety of Chinese patent application serial no. 202211132595.7 is hereby incorporated by reference herein and made a part of this specification.

TECHNICAL FIELD

The present application relates to the field of pipe fitting coupling, and, in particular, to a quick-fitting pipe fitting.

BACKGROUND

At the connection of multiple pipelines, pipe fittings are usually required to realize the connection. A pipe fitting generally is an elbow, a tee, a cross, a reducer and a pipe blind etc. A pipe fitting is generally coupled with a pipeline through a pipe connector. The pipe connector in the related art is a separate connection fitting. During an installation process, the pipe fitting must be aligned with the pipeline interface firstly, and then the pipe connector is engaged with the interface, and then the pipe connector is fastened with screws.

In the process of implementing the related technology, it is found that there are at least the following problems in the related technology: in an installation process, the steps of connecting the pipe connector and the pipeline are cumbersome, wherein the pipeline must be aligned firstly, and then the pipe connector can be installed, which leads to a low installation efficiency.

SUMMARY

A quick-fitting pipe fitting is disclosed, to improve the installation efficiency of pipe fittings.

The following technical scheme is adopted by the quick-fitting pipe fitting disclosed:

A quick-fitting pipe fitting for connecting at least one pipeline element, including a pipe fitting body, the pipe fitting body is configured with a pre-installation section, the pre-installation section is movably connected with a pipe clamp assembly, the pipe clamp assembly includes at least two movable clamp parts and at least one fastener, the fastener is configured to be operated to fasten the two movable clamp parts; a sealing ring is arranged in the pipe clamp assembly.

By the above technical scheme, the pipe fitting body is configured with a pre-installation section, such that the pipe clamp assembly can be movably connected to the pre-installation section, thereby during use the pipeline element can be placed directly at the position of the pipe fitting body corresponding to the movable clamp parts after the pipeline clamp assembly is in position, and then a fastening is realized by the fastener, which is beneficial to improving the installation efficiency.

Preferably, the pipe fitting body is configured as an elbow, a tee, a cross, a reducer, a pipe blind and a water pipe.

By the above technical solution, different pipe fitting bodies are provided to realize rapid installation for different usage requirements.

The first movable engagement key and the second movable engagement key disclosed help the pipe clamp assembly to more stably connect the pipe fitting body and the pipeline element.

By the present disclosure, the two-pieces clamp part is rotationally connected to the pre-installation section and is fastened by a fastener.

By the present disclosure, a detachable intermediate block is configured to realize a separate assembling of the pipe clamp assembly, and then the pipe clamp assembly can be fastened to the pipe fitting body, which is conducive to a reasonable distribution and improves the assembly efficiency.

By the present disclosure, the first movable clamp part and the second movable clamp part are not only rotationally connected to the pre-installation section, but also are hinged with each other in two pieces, wherein only one fastener is used to complete the fastening, which can improve the assembly efficiency.

By the present disclosure, the first movable clamp part and the second movable clamp part are rotationally connected to the pre-installation section through different hinge pins respectively.

By the present disclosure, the positions where the first movable clamp part and the second movable clamp part are hinged to the pre-installation section are also configured to intersect with each other, wherein a relief hole allows the intersecting position to freely rotate.

By the present disclosure, an abutment fastener, the first movable clamp part and the second movable clamp part together form a three-piece clamp structure, which reduces the complicated structural design at the intersection.

An outer offset section disclosed plays the role of sealing the gap between the outer wall of the end of the pipeline element and the sealing ring, and the inner offset section plays the role of sealing the gap between the inner wall of the end of the pipe fitting body and the sealing ring.

According to the present application, the sealing effect of the pipe fitting is further improved by adding an external first sealing element and a second sealing element, thus facilitating preventing corrosion of the pipe fitting.

According to the present application, different pipe fitting bodies are provided to achieve quick installation for different usage requirements.

By the technical solution of this application, the outer offset section plays the role of sealing the gap between the outer wall of the end of the pipeline element and the sealing ring, and the end face occlusion section plays the role of sealing the end face of the pipeline element and the abutment end face of the pipe fitting body.

According to the present application, the sealing effect of the pipe fitting is further improved by adding an external third sealing element and fourth sealing element, thus facilitating preventing corrosion of the pipe fitting.

Two sides of the end face occlusion section abut against the abutment face of the end face of the pipeline element by an arc face of the present application, thus improving the sealing performance of the sealing ring.

The end face occlusion section fits the abutment end face of the pipe fitting body more tightly by the sealing crimping block according to the present application, thus improving the sealing effect.

In summary, at least one of the following beneficial technical effects is realized:

1. The pipe clamp assembly is movably attached to the pre-installation section, such that the complex installation steps for placing the pipe clamp assembly are reduced in the installation process, simplifying the installation process and facilitating quick assembly with the pipeline elements;
2. The pipe clamp assembly is configured with various structures to adapt to different usage requirements, which reduces the complexity of structural design or facilitates quick installation and replacement, both of which are conducive to improvement of efficiency;
3. A variety of different sealing rings have different sealing structures, which can achieve sealing effects for different usage requirements.

Figure 1:
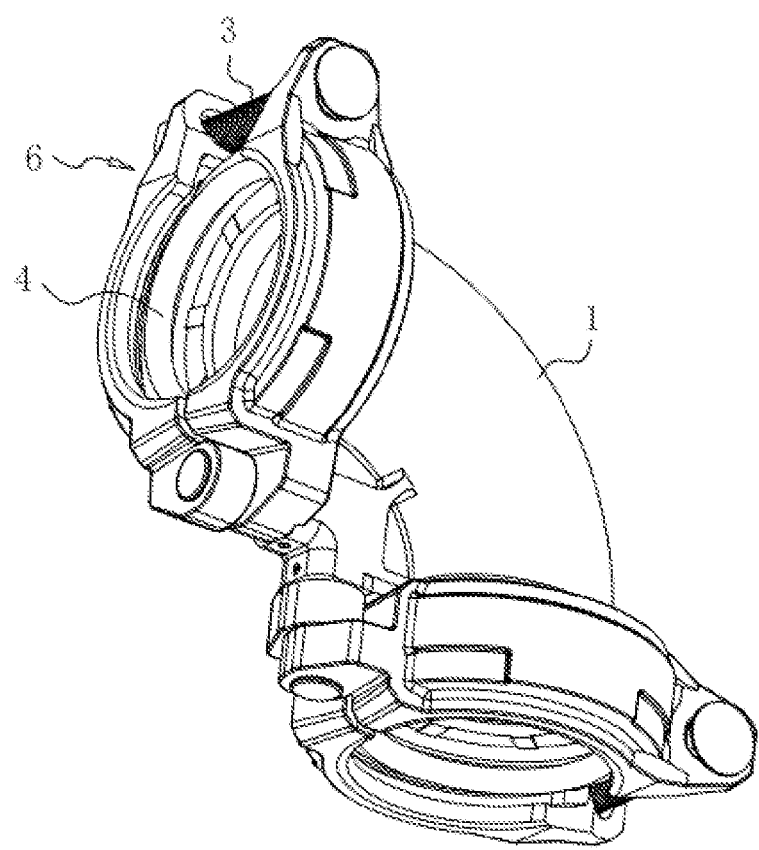
FIG. 1 is an overall structure diagram of Embodiment 1 according to the present application.

In the drawings: 1 pipe fitting body; 11 second joint peripheral face; 12 second coupling end; 13 first annular groove; 2 pre-installation section; 21 intermediate block; 3 fastener; 4 sealing ring; 41 base; 42 outer offset section; 43 inner offset section; 44 end face occlusion section; 45 sealing crimping block; 46 first sealing element; 47 second sealing element; 48 third sealing element; 49 fourth sealing element; 5 pipeline element; 51 first joint peripheral face; 52 first coupling end; 53 second annular groove; 54 fourth annular groove; 6 pipe clamp assembly; 61 first movable engagement key; 62 second movable engagement key; 63 first movable engagement face; 64 second movable engagement face; 65 first movable clamp part; 66 second movable clamp part; 67 first hinge pin; 68 second hinge pin; 69 third hinge pin; 610 relief hole; 611 inner cavity; 7 abutment fastener.

DESCRIPTION OF THE EMBODIMENTS

The present application will be described in further detail below in conjunction with FIGS. 1-39.

A quick-fitting pipe fitting is disclosed. FIG. 1 shows a quick-fitting pipe fitting configured to connect at least one pipeline element 5, including a pipe fitting body 1, the pipe fitting body 1 is configured with a pre-installation section 2, the pre-installation section 2 is movably connected with a pipe clamp assembly 6, the pipe clamp assembly 6 includes at least two movable clamp parts and at least one fastener 3, the fastener 3 is configured to be operated to fasten two movable clamp parts; a sealing ring 4 is arranged in the pipe clamp assembly 6.

Embodiment 1

Figure 2:
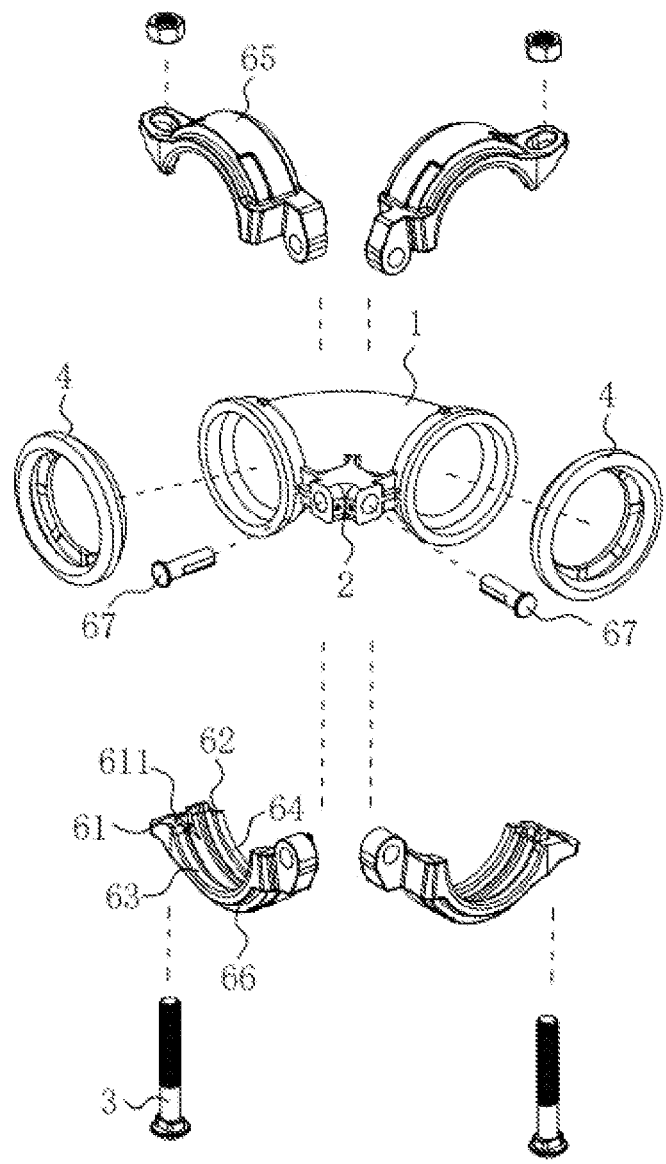
FIG. 2 is an exploded structure diagram of Embodiment 1 according to the present application.

A quick-fitting pipe fitting is disclosed by Embodiment 1 of the present application. FIG. 1 and FIG. 2 show a quick-fitting pipe fitting including a pipe fitting body 1, the pipe fitting body 1 is configured as a 90° elbow, which can be configured to connect two pipeline elements 5. A corner of the outer wall of the elbow is integrally formed with a pre-installation section 2, the pre-installation section 2 is rotationally connected with two sets of pipe clamp assemblies 6, the two sets of pipe clamp assemblies 6 are respectively installed at two openings of the elbow and arranged perpendicular to each other. Each set of pipe clamp assembly 6 includes two movable clamp parts and a fastener 3, the two movable clamp parts are a first movable clamp part 65 and a second movable clamp part 66 respectively, wherein the first movable clamp part 65 and the second movable clamp part 66 each are hinged on the pre-installation section 2 through one first hinge pin 67, the first hinge pin 67 is fixedly installed on the pre-installation section 2. A stationary end integrally extends each of the ends of the first movable clamp part 65 and the second movable clamp part 66 away from the hinge, the stationary end is configured with a stationary hole, wherein the ends of the two abutting stationary ends at the first movable clamp part 65 and the second movable clamp part 66 extend gradually away from each other. The fastener 3 includes a screw and a nut, wherein the screw passes through the stationary hole and is fastened by the nut. The first movable clamp part 65 and the second movable clamp part 66 are fastened by the fastener 3. A sealing ring 4 is arranged in the pipe clamp assembly 6, the sealing ring 4 is configured to improve the sealing between the pipeline element 5 and the pipe fitting body 1.

Figure 4:
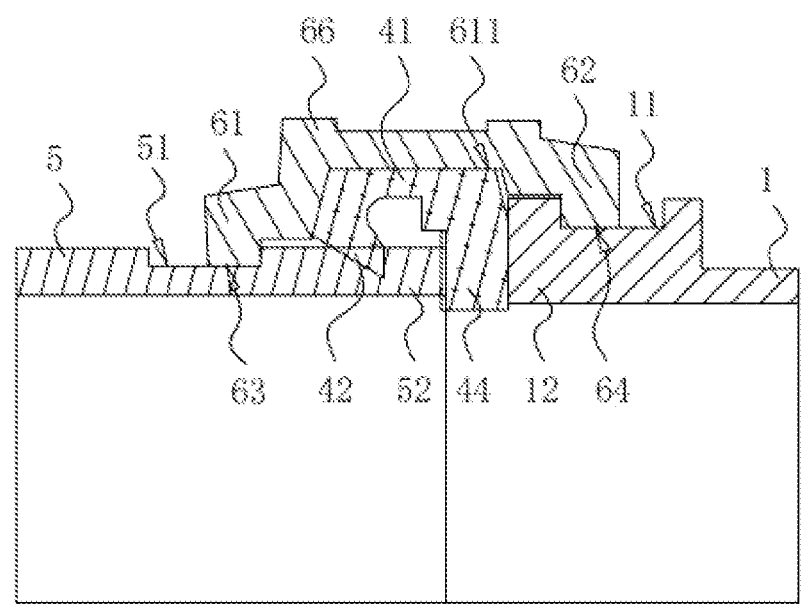
FIG. 4 is a section view of the connection between the first sealing ring and the pipeline element as well as the pipe fitting body in Embodiment 1 according to the present application.

In FIG. 4, the end of the pipeline element 5 mounted on one side of the pipe clamp assembly 6 is the first coupling end 52, the outer wall of the first coupling end 52 has a recessed first joint peripheral face 51, the first joint peripheral face 51 is configured such that the first coupling end 52 includes a concave face. The end of the pipe fitting body 1 mounted on the other side of the pipe clamp assembly 6 is the second coupling end 12, the outer wall of the second coupling end 12 includes a recessed second joint peripheral face 11, the second joint peripheral face 11 is configured such that the second coupling end 12 includes a concave face. The movable clamp part is integrated with a first movable engagement key 61 and a second movable engagement key 62 in the axial direction of the pipe clamp assembly 6, wherein the first movable engagement key 61 has a first movable engagement surface 63 to be engaged with the first joint peripheral face 51, and the second movable engagement key 62 has a second movable engagement surface 64 to be engaged with the second joint peripheral face 11.

In the installation process, the two movable clamp parts are fastened by the fastener 3, wherein the movable clamp parts abut against the first joint peripheral face 51 and the second joint peripheral face 11, such that a tight connection between the movable clamp parts of the pipeline element 5 and the pipe fitting body 1 can be realized, thereby they are not prone to separate from each other.

Figure 3:
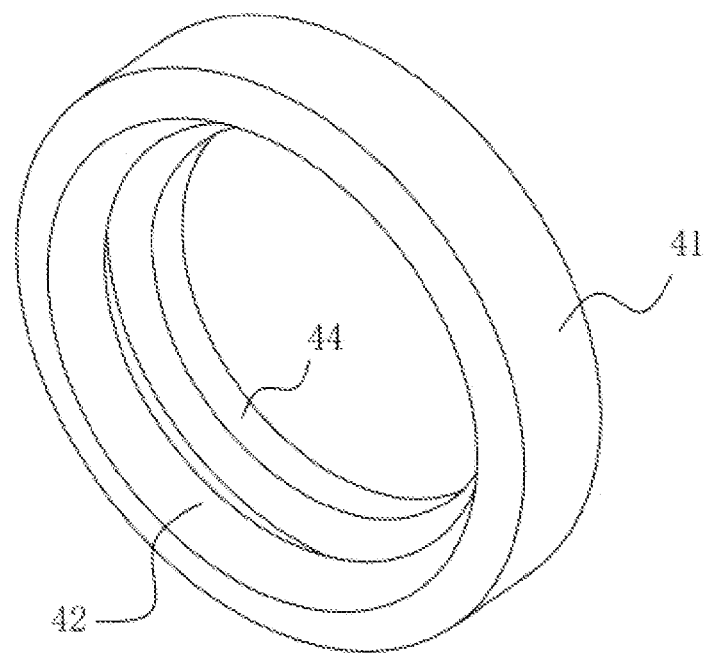
FIG. 3 is a structure view of the first sealing ring in Embodiment 1 cording to the present application.

Among them, the sealing ring 4 has following three configurations:

The first configuration includes an outer seal and an end seal. Referring to FIG. 3 and FIG. 4, the inner wall of the movable clamp part is configured with an inner cavity 611, and an end of the pipe fitting body 1 has an abutment end face. The sealing ring 4 includes a base 41, an outer offset section 42 extending integrally at one end of the base 41 and an end face occlusion section 44 extending integrally at the other end of the base 41, wherein the base 41 is configured in form of a circular ring and is accommodated in the inner cavity 611. The free end of the outer offset section 42 extends gradually away from the base 41 and gradually close to the end face occlusion section 44, wherein the end of the free end tapers, and the outer offset section 42 is configured to be tightly pressed against the outer peripheral wall of the end of the pipeline element 5. The cross-section of the end face occlusion section 44 is generally rectangular, two side walls of the end face occlusion section 44 are configured to be tightly pressed against the end face of the pipeline element 5 and the abutment end face of the pipe fitting body 1 respectively. Among them, the side surface of the end face occlusion section 44 configured to be pressed against the abutment end face of the pipe fitting body 1 is a smooth arc surface, and the abutment face of the end face occlusion section 44 configured to be pressed against the end face of the pipeline element 5 is a smooth arc surface, so as to achieve a fitting and tight connection.

Figure 5:
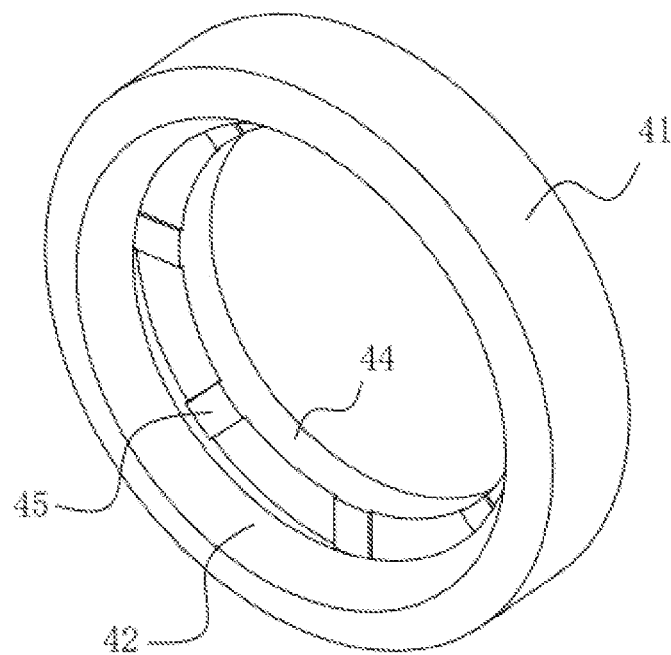
FIG. 5 is a structure view of the second sealing ring in Embodiment 1 according to the present application.
Figure 6:
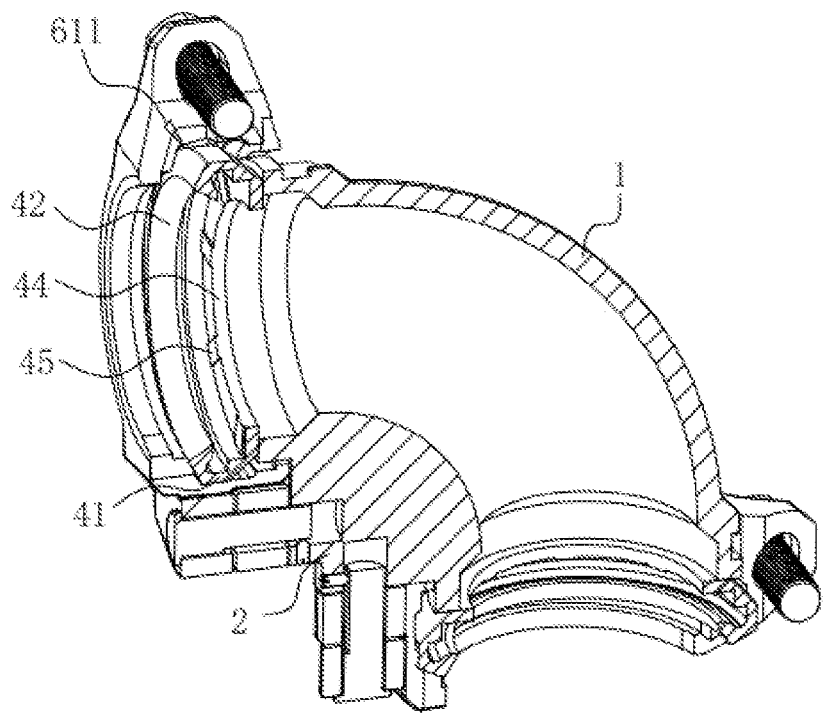
FIG. 6 is a section view of the quick-fitting pipe fitting with the second sealing ring in Embodiment 1 according to the present application.

The second configuration includes an outer seal and an end seal. Referring to FIG. 5 and FIG. 6, which is different from the first configuration, wherein the smooth arc surface of the end face occlusion section 44 configured to be pressed against the end face of the pipeline element 5 is additionally configured with a plurality of sealing crimping blocks 45, which are equidistantly distributed along the circumference, the sealing crimping blocks 45 are integrally formed on the end face occlusion section 44, which increases the tightness of the abutment, so as to improve the sealing effect.

Figure 7:
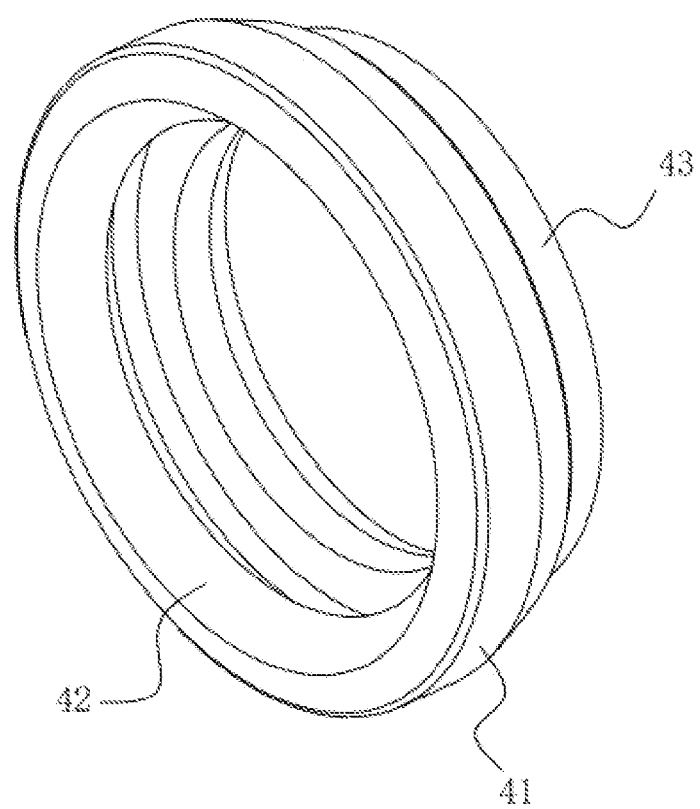
FIG. 7 is a structure view of the third sealing ring in Embodiment 1 according to the present application.
Figure 8:
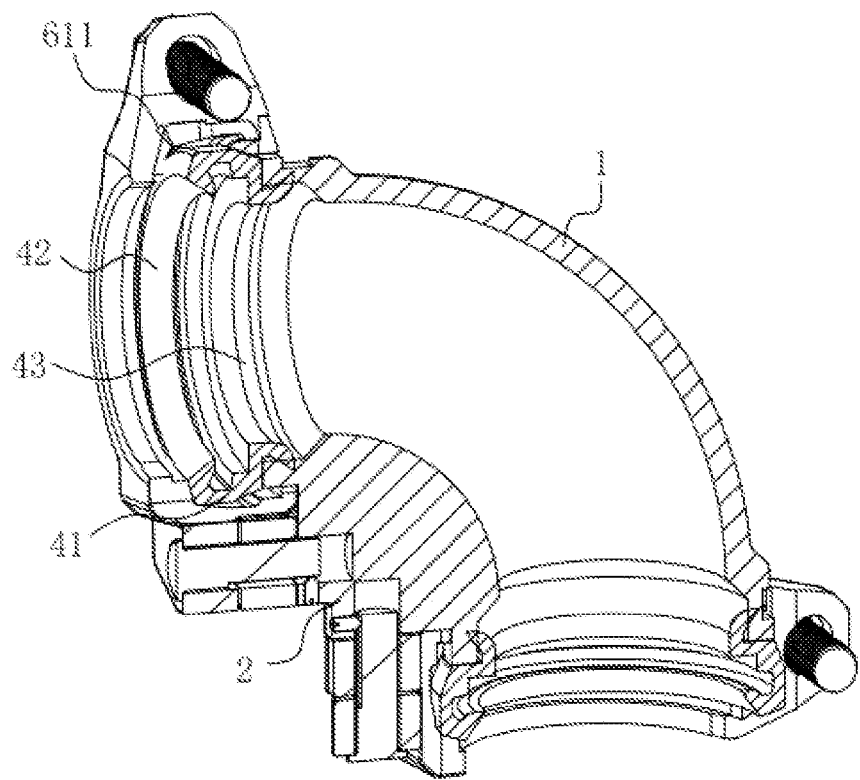
FIG. 8 is a section view of the quick-fitting pipe fitting with the third sealing ring in Embodiment 1 according to the present application.
Figure 9:
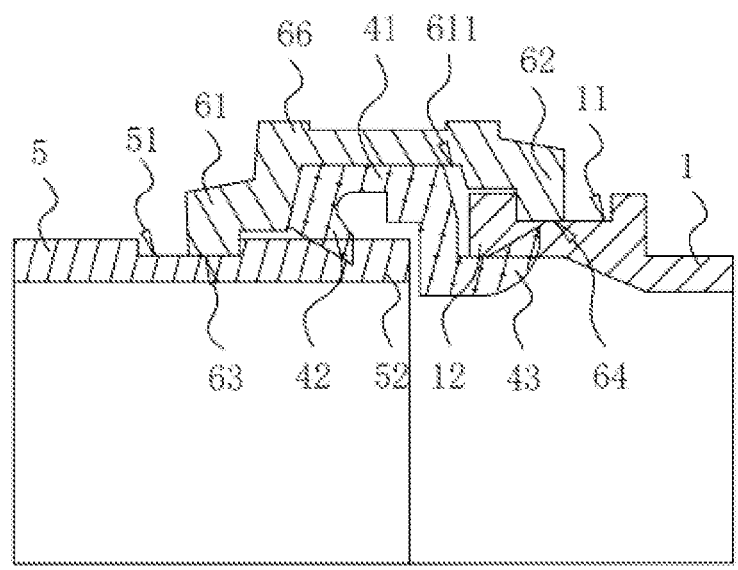
FIG. 9 is a section view of the connection between the third sealing ring and the pipeline element as well as the pipe fitting body in Embodiment 1 according to the present application.

The third configuration includes an outer seal and an inner seal. Referring to FIG. 7, FIG. 8 and FIG. 9, the sealing ring 4 includes a base 41, an outer offset section 42 extending integrally at one end of the base 41 and an inner offset section 43 extending integrally at the other end of the base 41, wherein the base 41 is configured in form of a circular ring and is accommodated in the inner cavity 611. The free end of the outer offset section 42 is offset in a direction close to the center of the base 41 and to a side closed to the inner offset section 43, wherein the thickness of the free end becomes gradually thinner. In the installation process, the outer offset section 42 is pressed against the outer peripheral wall of the end of the pipeline element 5, the free end of the inner offset section 43 is offset in a direction away from the center of the base 41, wherein the inner offset section 43 is pressed against the inner peripheral wall of the end of the pipe fitting body 1 after inserting into the pipe fitting body 1.

Figure 10:
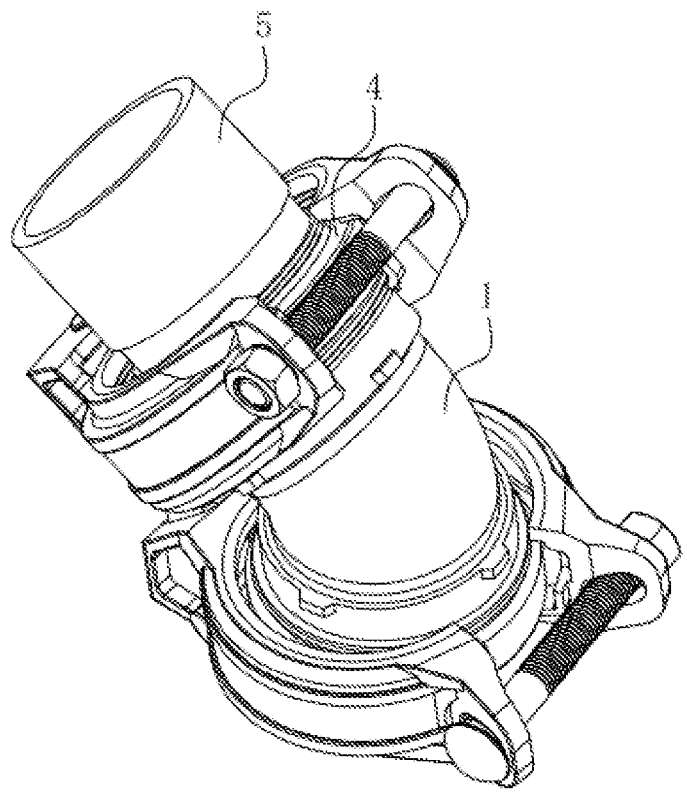
FIG. 10 is a structure diagram of the pipe fitting body in a further sealing state in embodiments according to the present application.

Referring to FIG. 10, in order to further improve the sealing of the pipe fitting, especially the anti-corrosion property of the exterior of the pipe fitting, the following parallel solutions for further sealing are provided for the sealing rings of the three configurations mentioned above.

Figure 11:
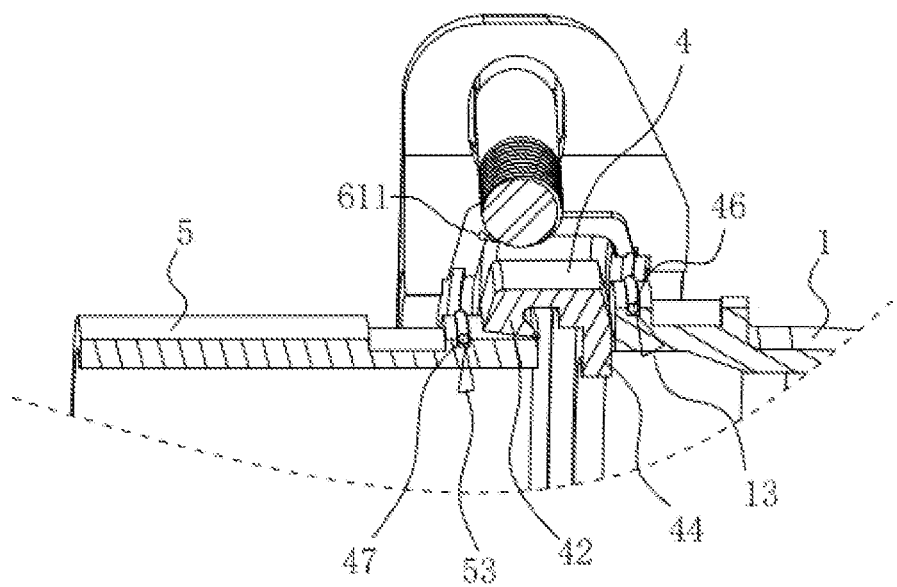
FIG. 11 is a view mainly for showing the situation with the first sealing ring and the second sealing ring, wherein both the first sealing element and the second sealing element are rubber rings.
Figure 12:
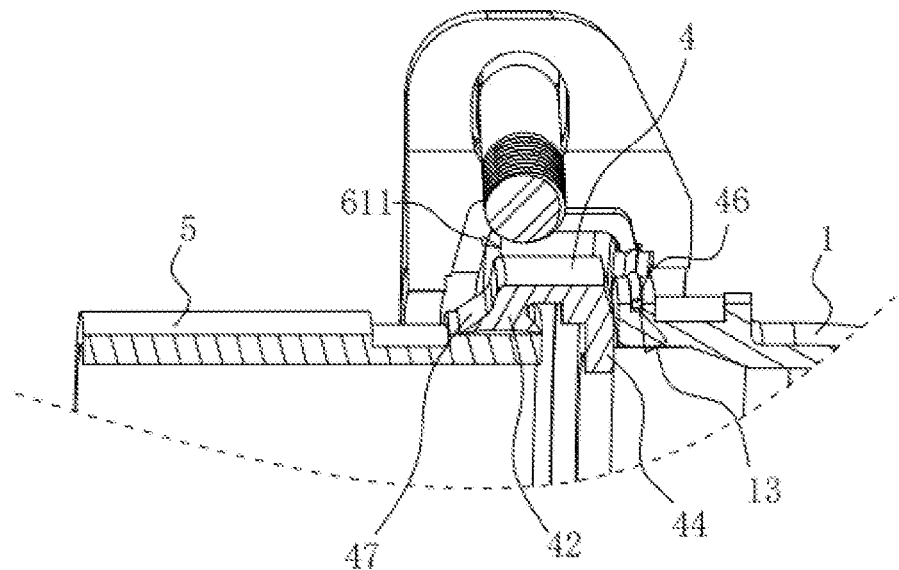
FIG. 12 is a view mainly for showing the situation with the first sealing ring and the second sealing ring, wherein the first sealing element is a rubber ring while the second sealing element is a first extension end.

FIG. 10, FIG. 11 and FIG. 12 illustrate a further optimization for the sealing ring 4 in the first configuration and second configuration. The embodiments of the present application also include a first sealing element 46 and a second sealing element 47, wherein the first sealing element 46 is located at a side of the sealing ring 4 away from the outer offset section 42, the first sealing element 46 is configured as a rubber ring, the outer wall of the end of the pipe fitting body 1 is configured with a first annular groove 13, the first sealing element 46 is arranged in the first annular groove 13, and the inner wall of the movable clamp part is pressed against the first sealing element 46, to achieve further sealing at a side of the end face occlusion section 44. The second sealing element 47 is located at a side of the sealing ring 4 near the outer offset section 42.

The second sealing element 47 has two configurations: the first configuration is illustrated in FIG. 11, the second sealing element 47 is configured as a rubber ring, the outer peripheral wall of the end of the pipeline element 5 is configured with a second annular groove 53, the second sealing element 47 is arranged in the second annular groove 53, and the inner wall of the movable clamp part is pressed against the second sealing element 47, to achieve further sealing at a side of the outer offset section 42. The second configuration for the second sealing element 47 is illustrated in FIG. 12, the second sealing element 47 is integrally formed at a side of the outer offset section 42 away from the end face occlusion section 44, thereby forming an extension end, wherein the sealing effect of the outer offset section 42 is improved by the extension end, thereby achieving further sealing at a side of the outer offset section 42.

Figure 13:
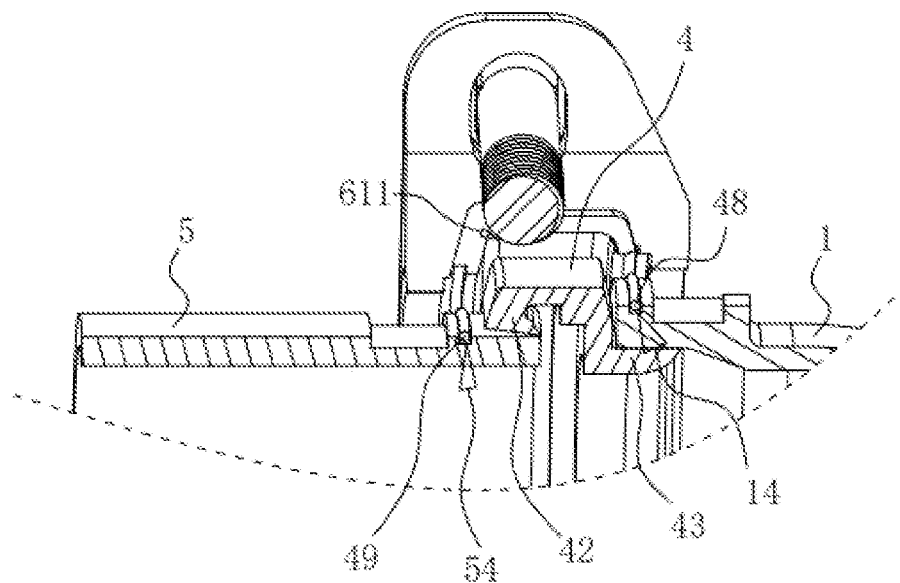
FIG. 13 is a view mainly for showing the situation with the third sealing ring, wherein both the third sealing element and the fourth sealing element are rubber rings.
Figure 14:
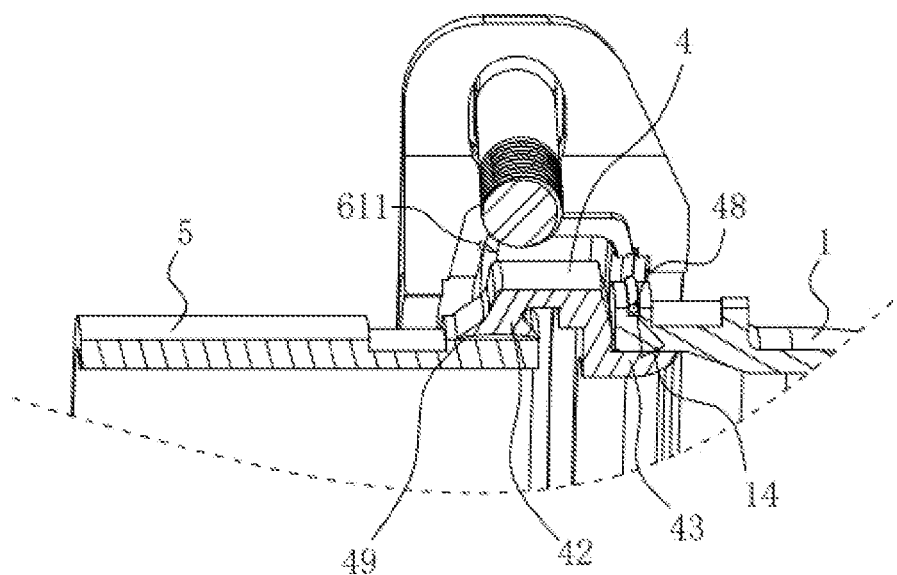
FIG. 14 is a view mainly for showing the situation with the third sealing ring, wherein the third sealing element is a rubber ring while the fourth sealing element is a second extension end.

FIG. 13 and FIG. 14 illustrate a further optimization for the sealing ring 4 in the third configuration. The embodiments of the present application also includes a third sealing element 48 and a fourth sealing element 49, wherein the third sealing element 48 is located at a side of the sealing ring 4 away from the outer offset section 42, the third sealing element 48 is configured as a rubber ring, the outer wall of the end of the pipe fitting body 1 is configured with a third annular groove 14, the third sealing element 48 is arranged in the third annular groove 14, and the inner wall of the movable clamp part is pressed against the third sealing element 48, to achieve further sealing at a side of the inner offset section 43.

In FIG. 13, the fourth sealing element 49 is located at a side of the sealing ring 4 close to the outer offset section 42. The fourth sealing element 49 has two configurations: in the first figuration, the fourth sealing element 49 is configured as a rubber ring, the outer peripheral wall of the end of the pipeline element 5 is configured with a fourth annular groove 54, the fourth sealing element 49 is arranged in the fourth annular groove 54, and the inner wall of the movable clamp part is pressed against the fourth sealing element 49, to achieve further sealing at a side of the outer offset section 42. The second configuration for the fourth sealing element 49 is illustrated in FIG. 14, the fourth sealing element 49 is integrally formed at a side of the outer offset section 42 away from the inner offset section 43, thereby forming an extension end, wherein the sealing effect of the outer offset section 42 is improved by the extension end, thereby achieving further sealing at a side of the outer offset section 42.

In addition, the pipe fitting body 1 in the present application takes a 90° elbow as an example. The 90° elbow can also be replaced by other elbows, as well as a tee, a cross, a reducer, pipe blind, a water pipe or other pipeline connector. The pipe fitting body in this embodiment can also be classified into two categories: steel pipes and HDPE pipes. Among them, steel pipes are classified into: 90° elbow, 45° elbow, reducer, pipe blind, equal tee, and equal cross. HDPE pipes are classified into: p type water storage pipe, lateral cross.

Figure 15:
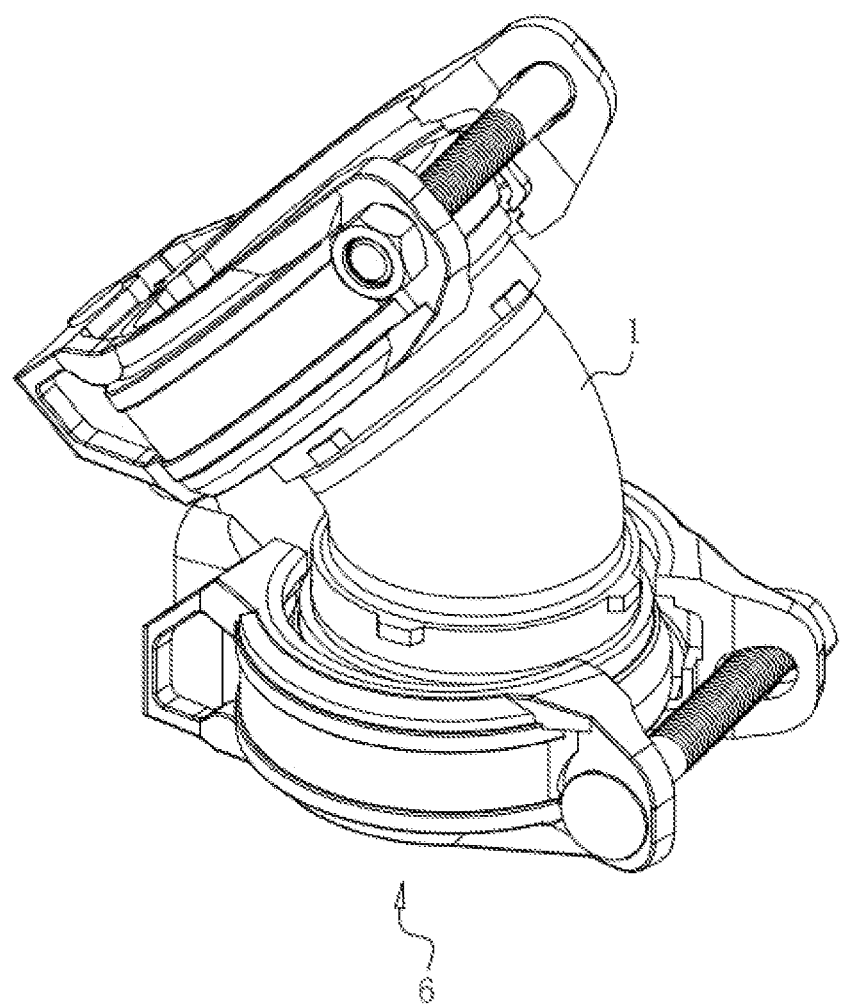
FIG. 15 is a structure diagram of a 45° elbow as the pipe fitting body in embodiments according to the present application.

FIG. 15 illustrates a structure diagram of a 45° elbow as the pipe fitting body 1.

Figure 16:
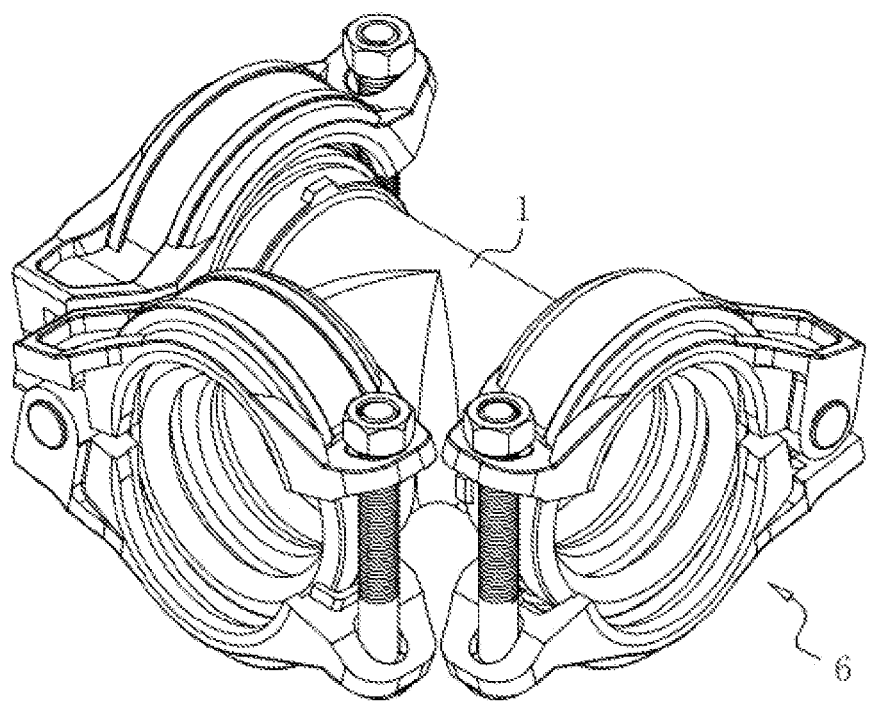
FIG. 16 is a structure diagram of an equal tee as the pipe fitting body is in embodiments according to the present application.

FIG. 16 illustrates a structure diagram of an equal tee as the pipe fitting body 1.

Figure 17:
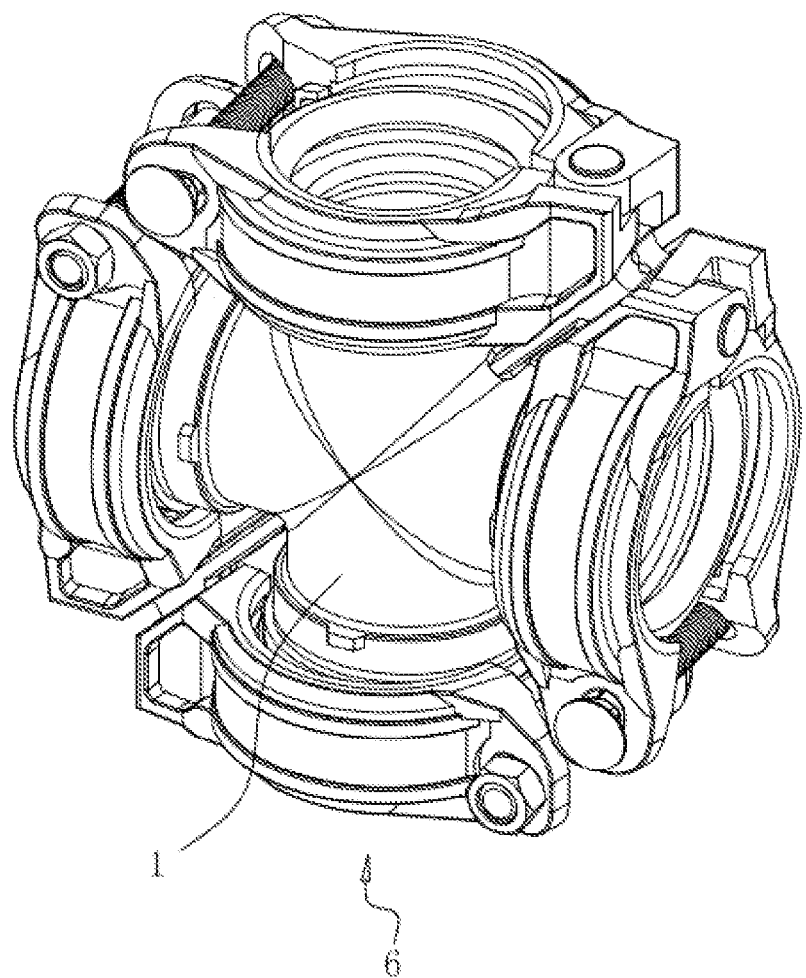
FIG. 17 is a structure diagram of an equal cross as the pipe fitting body in embodiments according to the present application.

FIG. 17 illustrates a structure diagram of an equal cross as the pipe fitting body 1.

Figure 18:
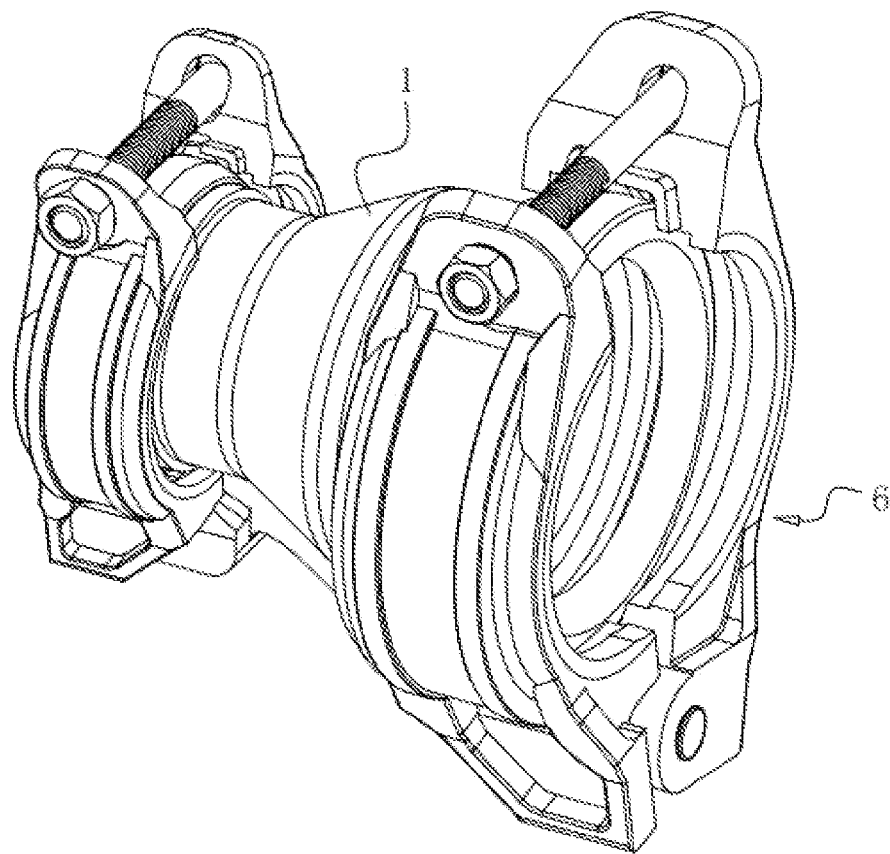
FIG. 18 is a structure diagram of a reducer as the pipe fitting body in the embodiments according to the present application.

FIG. 18 illustrates a structure diagram of a reducer as the pipe fitting body 1.

Figure 19:
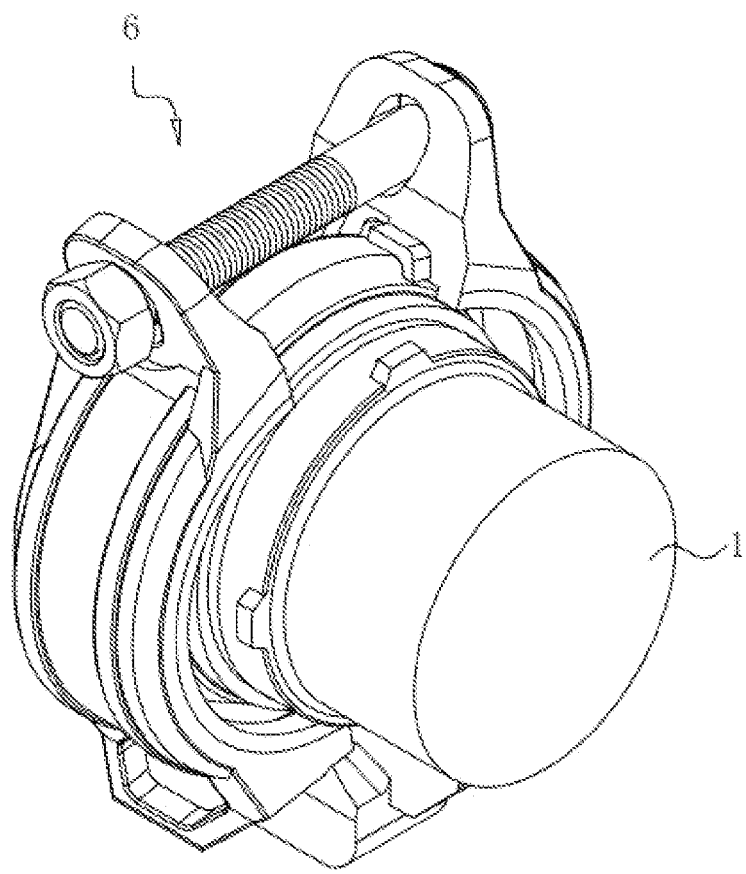
FIG. 19 is a structure diagram of a pipe blind as the pipe fitting body in the embodiments according to the present application.

FIG. 19 illustrates a structure diagram of a pipe blind as the pipe fitting body 1.

Figure 20:
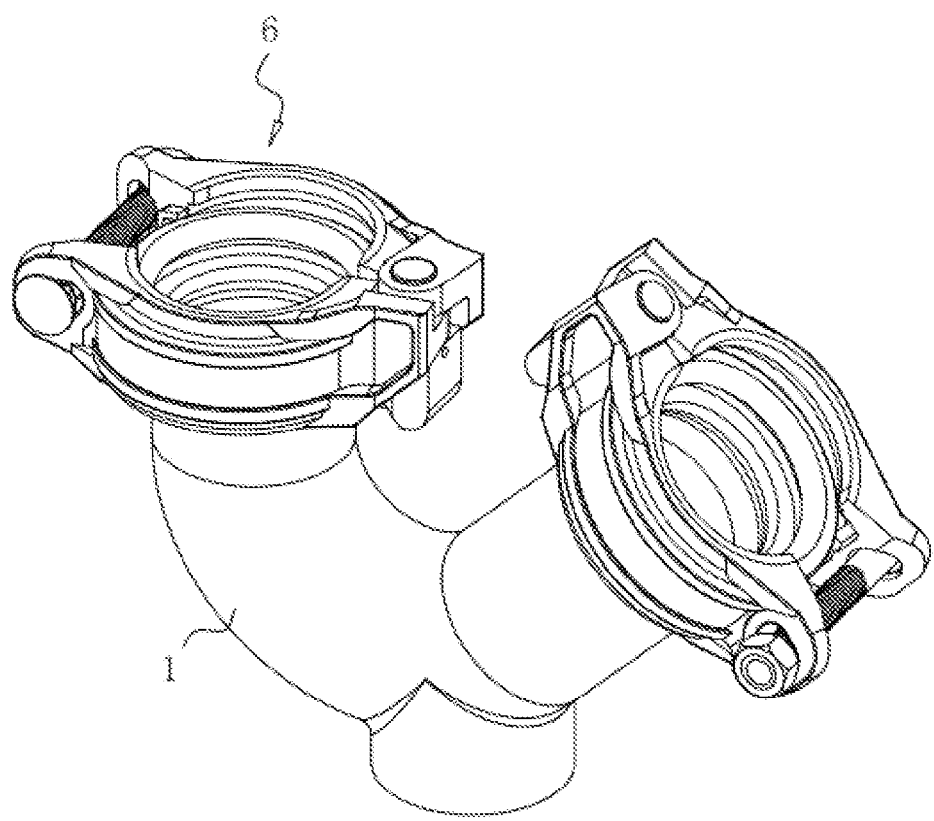
FIG. 20 is a structure diagram of a p type water storage pipe as the pipe fitting body in the embodiments according to the present application.

FIG. 20 illustrates a structure diagram of a p type water storage pipe as the pipe fitting body 1.

Figure 21:
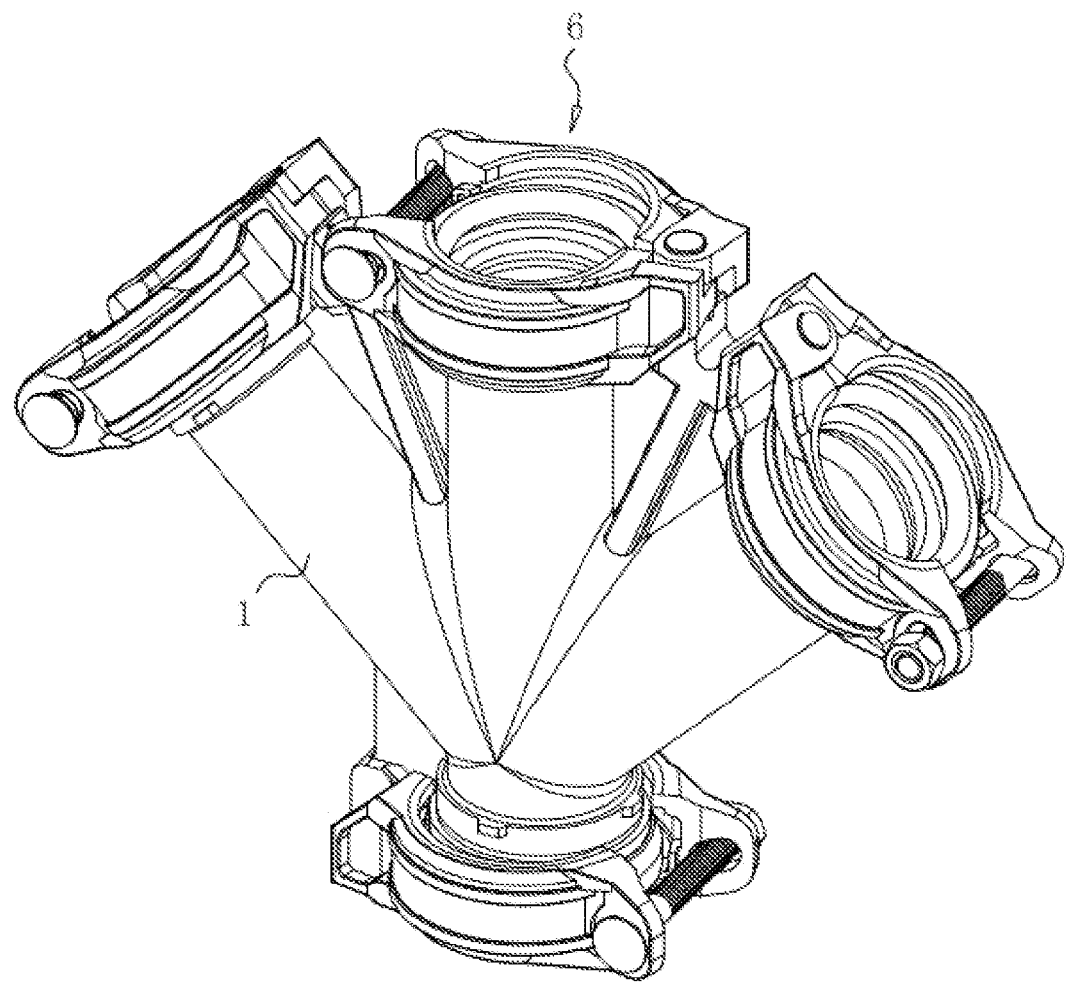
FIG. 21 is a structure diagram of a lateral cross as the pipe fitting body in the embodiments according to the present application.

FIG. 21 illustrates a structure diagram of a lateral cross as the pipe fitting body 1.

The implementation principle of a quick-fitting pipe fitting in the embodiments of the present application is: the pipe clamp assembly 6 can be assembled on the pipe fitting body 1 in advance through the pre-installation section 2 integrally formed on the pipe fitting body 1. During the usage, the pipeline element 5 is directly placed at the position of the movable clamp part after the pipe clamp assembly 6 has been placed in position. When the two movable clamp parts are fastened by the fastener 3, they are respectively deformed for respectively connecting with the first joint peripheral face 51 and the second joint peripheral face 11 tightly, to achieve fastening, which improves the overall installation efficiency.

Embodiment 2

Figure 22:
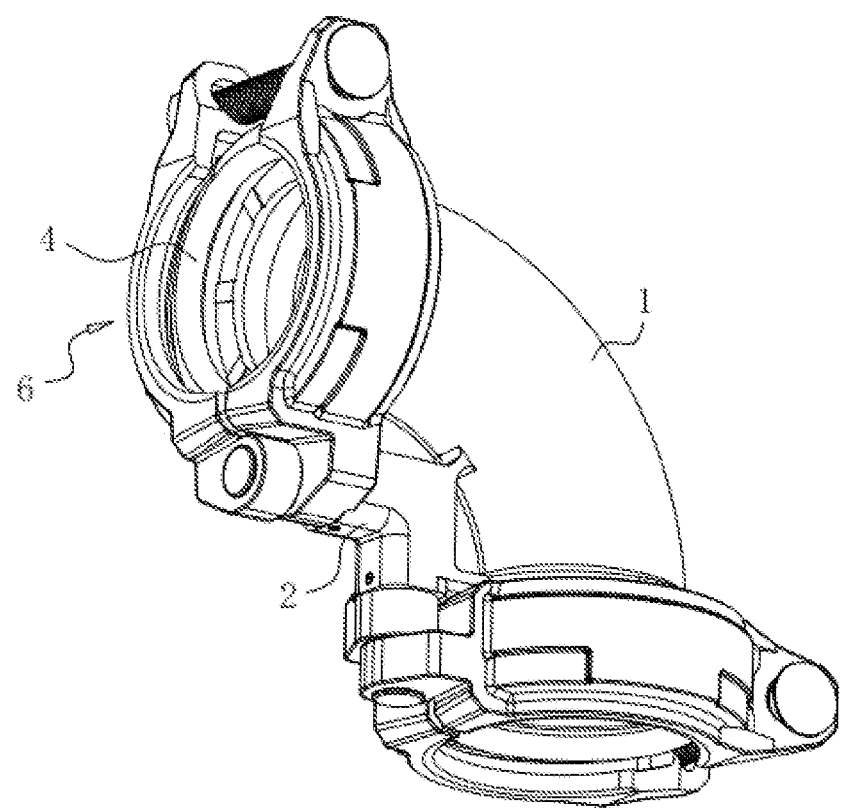
FIG. 22 is an overall structure diagram of Embodiment 2 according to the present application.
Figure 23:
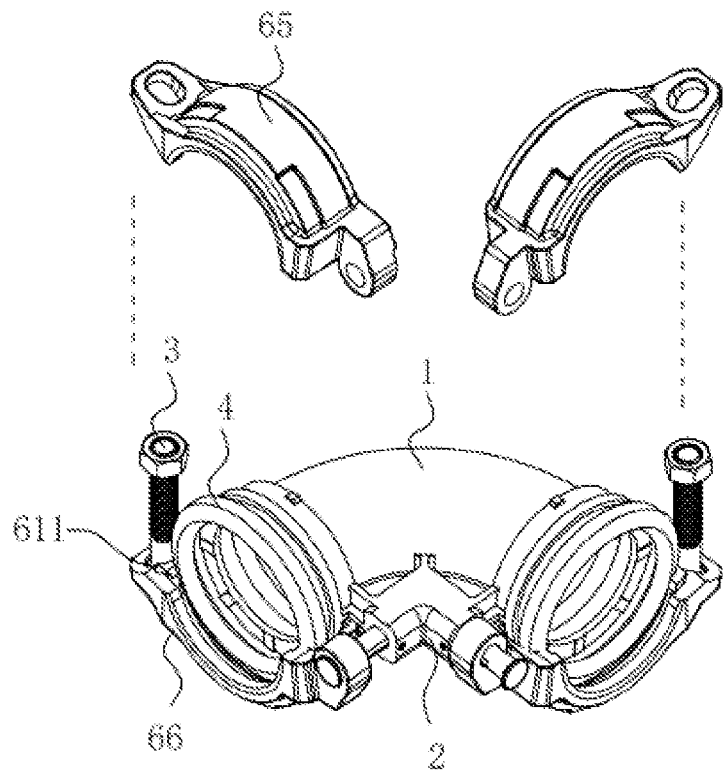
FIG. 23 is an exploded structure diagram of partial structure of Embodiment 2 according to the present application.

Embodiment 2 of the present application discloses a quick-fitting pipe fitting, referring to FIG. 22 and FIG. 23, which has a substantially same structure as that of Embodiment 1, the difference is that the pipe fitting body 1 has an elongate configuration, wherein the structure extending from the pre-installation section 2 has enough space for rotation of the two sets of pipe clamp assemblies 6, such that interfere isn't prone to occur.

Figure 24:
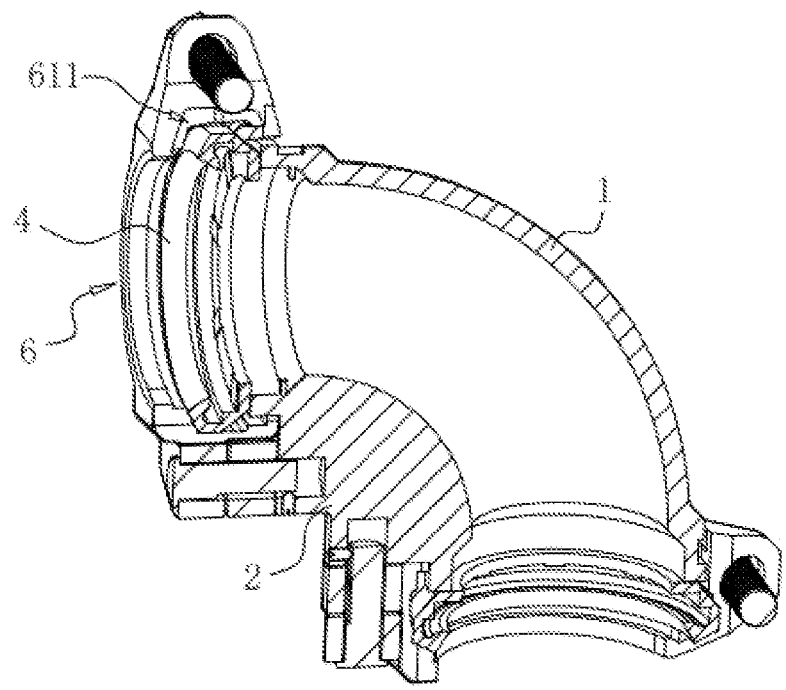
FIG. 24 is a section view of Embodiment 2 according to the present application, wherein the sealing ring includes an outer seal and an end seal.

FIG. 24 illustrates a situation, in which the sealing ring 4 includes an outer seal and an end seal.

Figure 25:
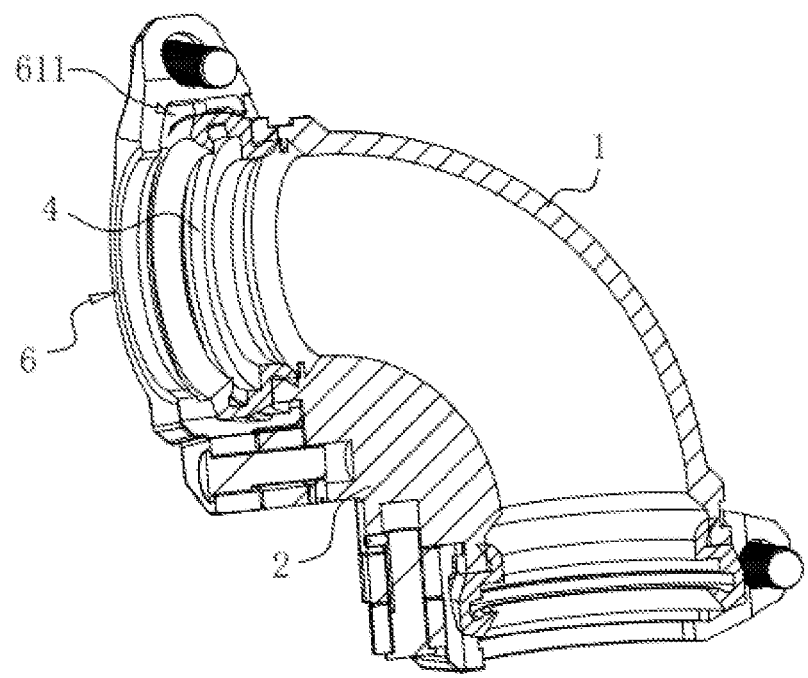
FIG. 25 is a section view of Embodiment 2 according to the present application, wherein the sealing ring includes an outer seal and an inner seal.

FIG. 25 illustrates a situation, in which the sealing ring 4 includes an end seal and an inner seal.

The sealing ring 4 of the present embodiment can have the configuration of other sealing rings 4 in Embodiment 1.

The implementation principle of a quick-fitting pipe fitting in the embodiments of the present application is: the elbow with elongate configuration is adapted to different pipeline connection requirements. During the installation process, another set of pipe clamp assembly 6 mustn't be disassembled for installation, which is conducive to improving the assembly efficiency. And in the installation process, the two movable clamp parts are fastened by the fastener 3, meanwhile the movable clamp parts are deformed and gradually fit the first joint peripheral face 51 and the second joint peripheral face 11, so as to realize a tight connection between the movable clamp parts and the pipeline element 5 and the pipe fitting body 1.

Embodiment 3

Figure 26:
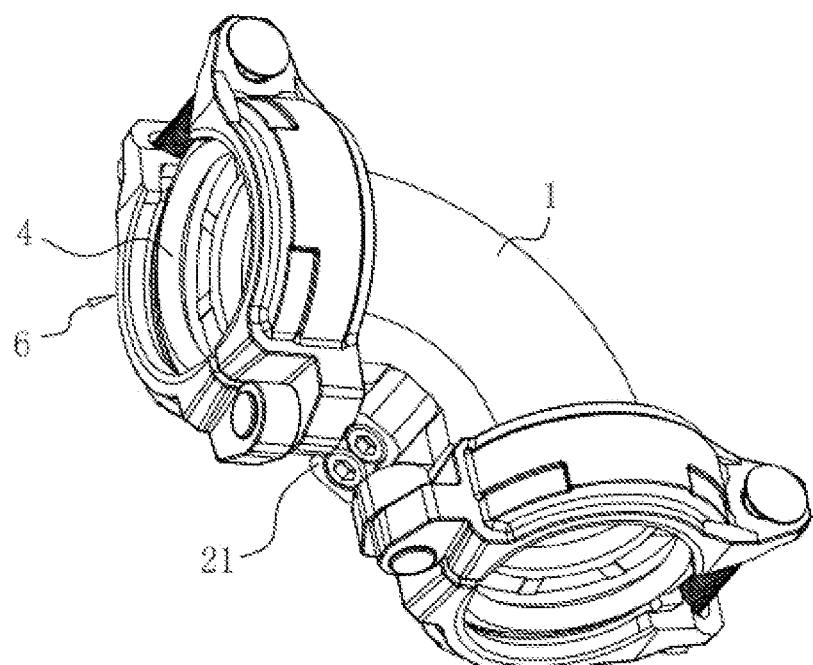
FIG. 26 is an overall structure diagram of Embodiment 3 according to the present application.
Figure 27:
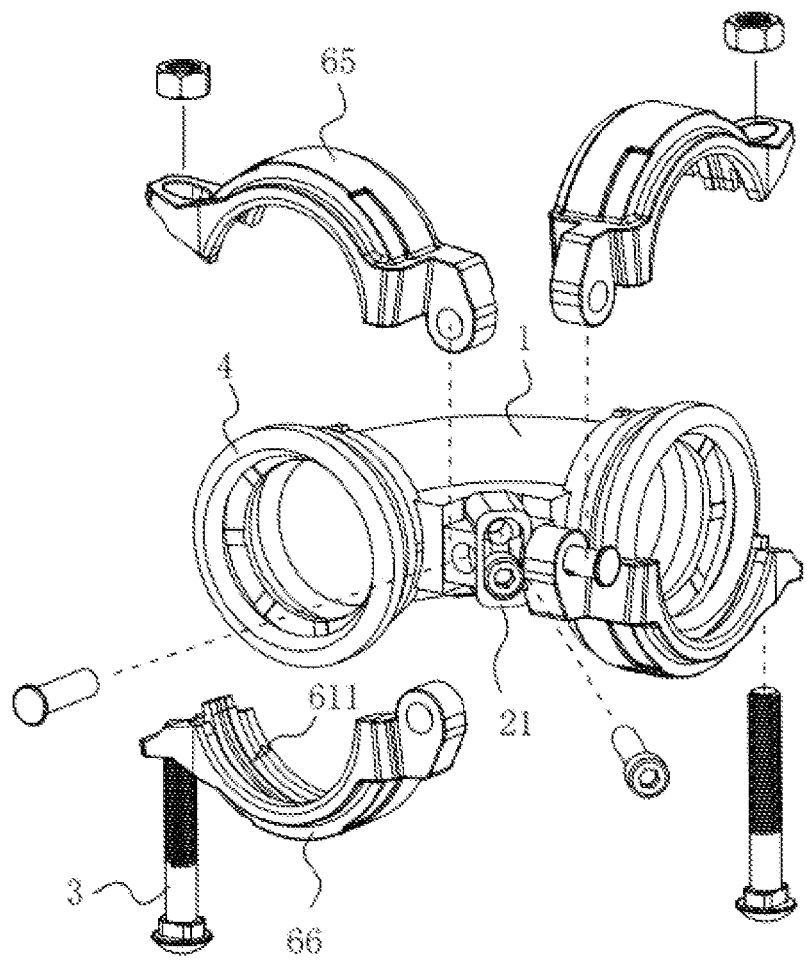
FIG. 27 is an exploded structure diagram of partial structure of Embodiment 3 according to the present application.

Embodiment 3 of the present application discloses a quick-fitting pipe fitting, referring to FIG. 26 and FIG. 27, which has a substantially same structure as that of Embodiment 1, the difference is that the pre-installation section 2 includes an intermediate block 21, the intermediate block 21 is detachably attached to the outer wall of the pipe fitting body 1 through two side-by-side screws. The two sets of pipe clamp assemblies 6 are mounted on an intermediate block 21 symmetrically, wherein the first movable clamp part 65 and the second movable clamp part 66 of a set of pipe clamp assembly 6 are hinged at the intermediate block 21 through a hinge pin, the two hinge pins are arranged perpendicular to each other.

Figure 28:
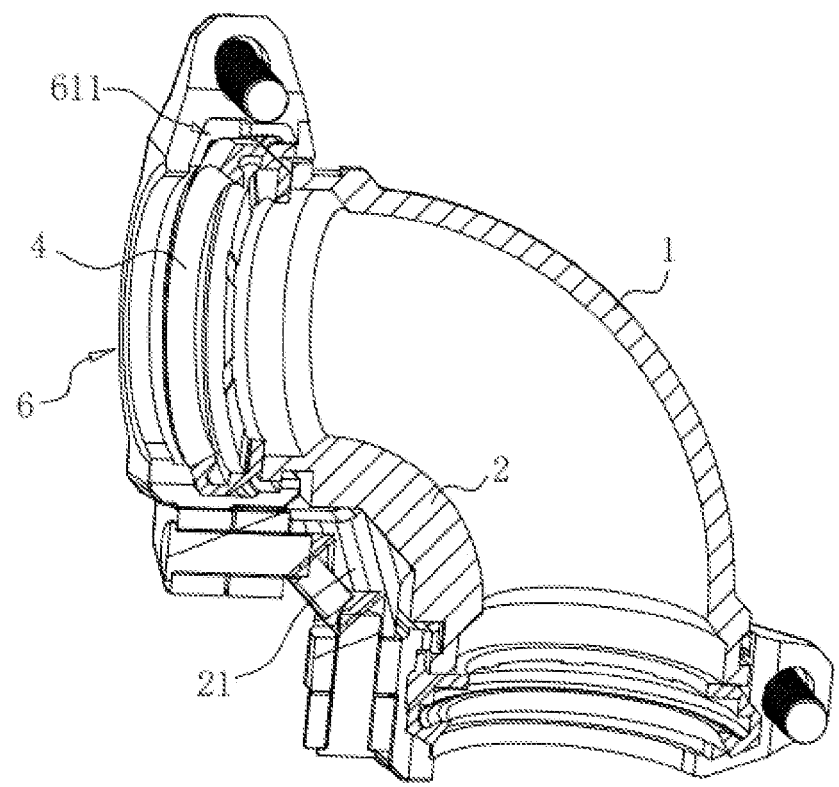
FIG. 28 is a section view of Embodiment 3 according to the present application, wherein the sealing ring includes an outer seal and an end seal.

FIG. 28 illustrates a situation, in which the sealing ring 4 includes an outer seal and an end seal.

Figure 29:
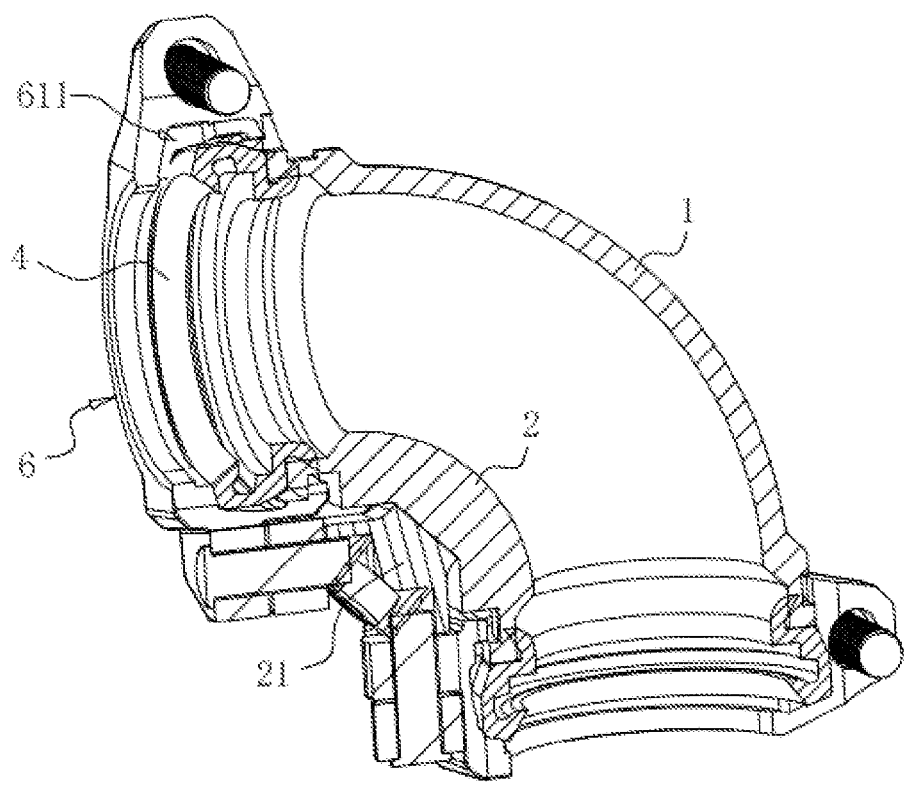
FIG. 29 is a section view of Embodiment 3 according to the present application, wherein the sealing ring includes an outer seal and an inner seal.

FIG. 29 illustrates a situation, in which the sealing ring 4 includes an end seal and an inner seal.

The sealing ring 4 of the present embodiment can have the configuration of other sealing rings 4 in Embodiment 1.

Figure 30:
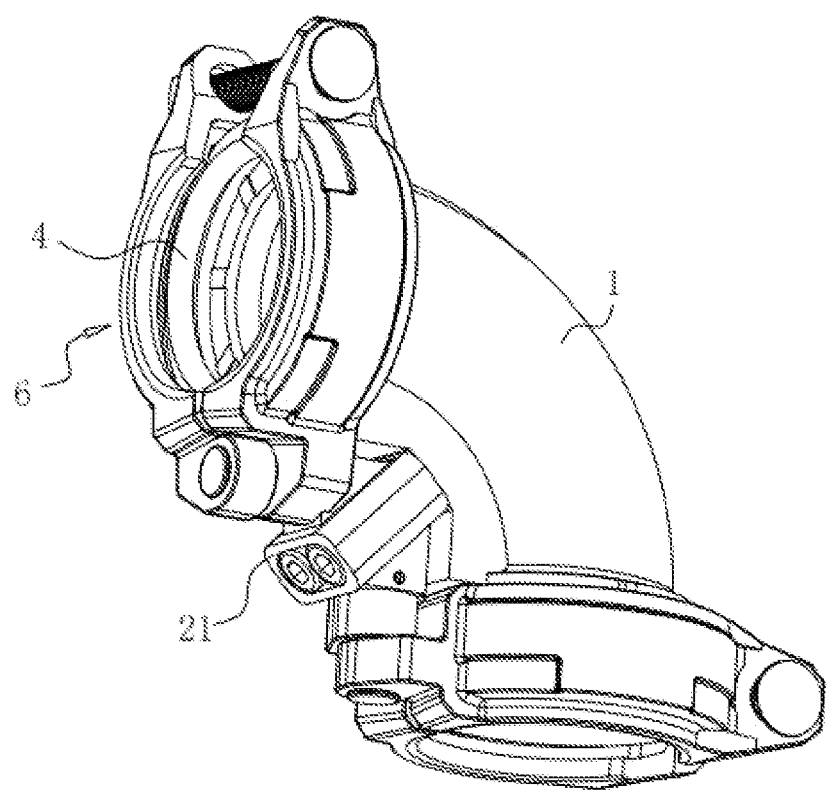
FIG. 30 is an overall structure diagram of Embodiment 3 according to the present application, wherein the intermediate block 21 has an elongate configuration.
Figure 31:
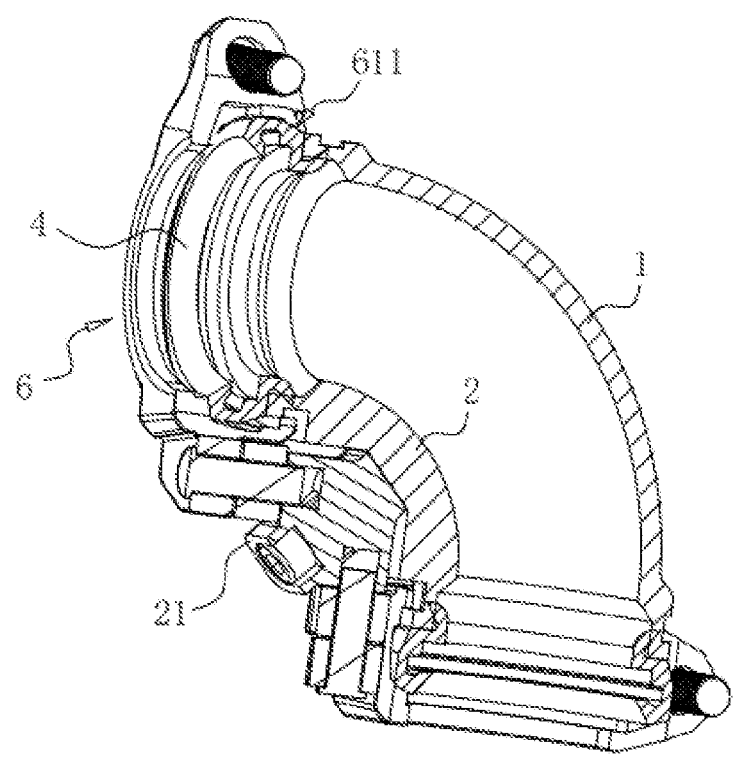
FIG. 31 is a section view of Embodiment 3 according to the present application, wherein the intermediate block 21 has an elongate configuration.

FIG. 30 and FIG. 31 illustrate the elongate configuration of the intermediate block 21 to improve structure strength of the intermediate block 21, so as to improve the structure stability of the quick-fitting pipe fitting.

The implementation principle of a quick-fitting pipe fitting in the embodiment of the present application is: the two set of pipe clamp assemblies 6 can be installed on the intermediate block 21 in advance through the intermediate block 21, the assembled structure is then fastened on the elbow by two screws, which is conducive to a reasonable distribution of production and installation steps, by which different structures of pipe clamp assemblies 6 can be installed for different use requirements, to improve the installation efficiency. In the installation process, the two movable clamp parts are fastened by the fastener 3, meanwhile the movable clamp parts are deformed and gradually fit the first joint peripheral face 51 and the second joint peripheral face 11, so as to realize the tight connection of the movable clamp parts with the pipeline element 5 and the pipe fitting body 1.

Embodiment 4

Figure 32:
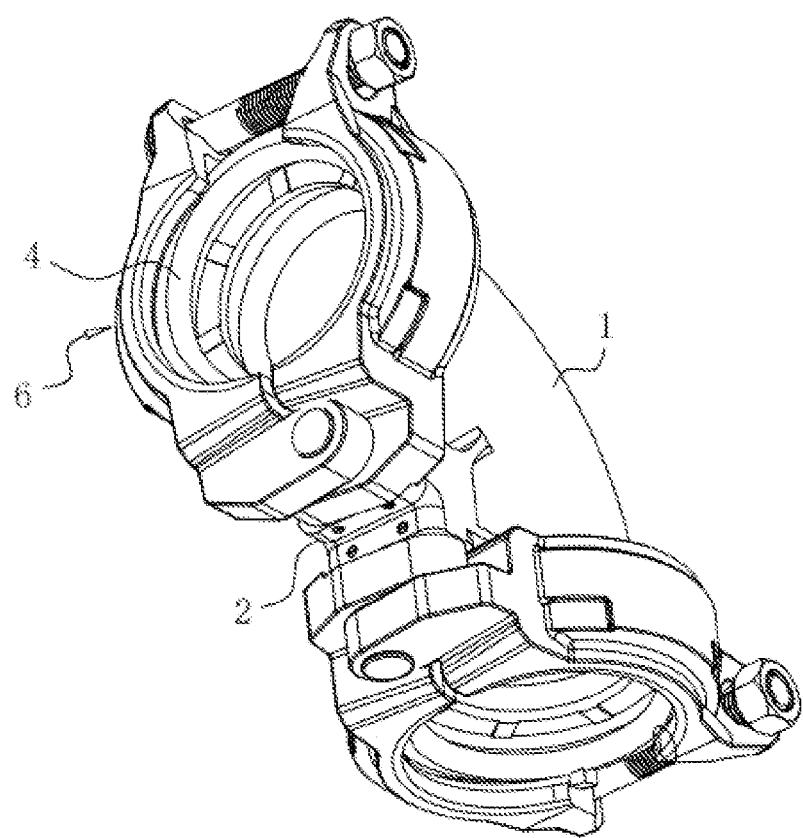
FIG. 32 is an overall structure diagram of Embodiment 4 according to the present application.
Figure 33:
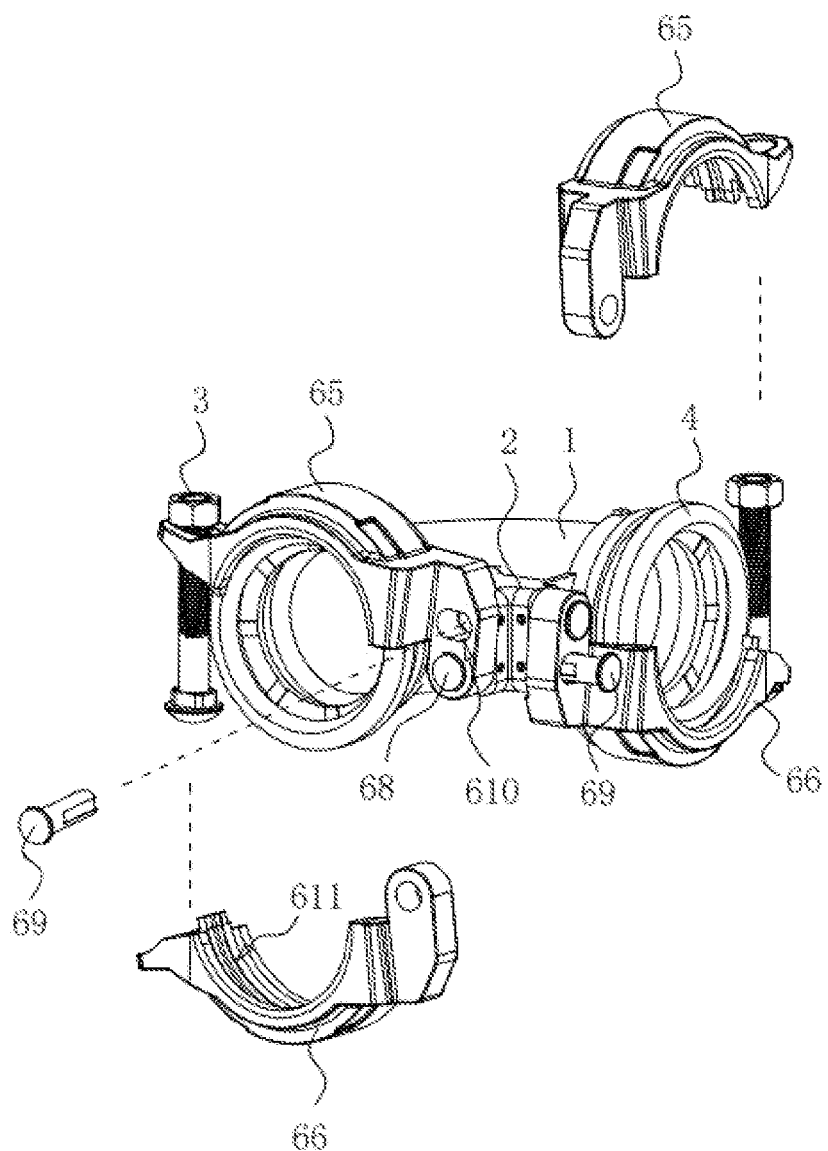
FIG. 33 is an exploded diagram of partial structure of Embodiment 4 according to the present application.

Embodiment 4 of the present application discloses a quick-fitting pipe fitting, referring to FIG. 32 and FIG. 33, which has a substantially same structure as that of Embodiment 1, the difference is the connection structure of the first movable clamp part 65 and the second movable clamp part 66 on the pre-installation section 2: the first movable clamp part 65 is hinged on the pre-installation section 2 through the second hinge pin 68, wherein the second hinge pin 68 is fixedly installed on the pre-installation section 2; the second movable clamp part 66 is hinged on the pre-installation section 2 through the third hinge pin 69, wherein the third hinge pin 69 is fixedly installed on the pre-installation section 2. The first movable clamp part 65 is provided with a relief hole 610 for the third hinge pin 69 to pass through, the inner diameter of the relief hole 610 is larger than the outer diameter of the third hinge pin 69, such that the first movable clamp part 65 can freely rotate.

Figure 34:
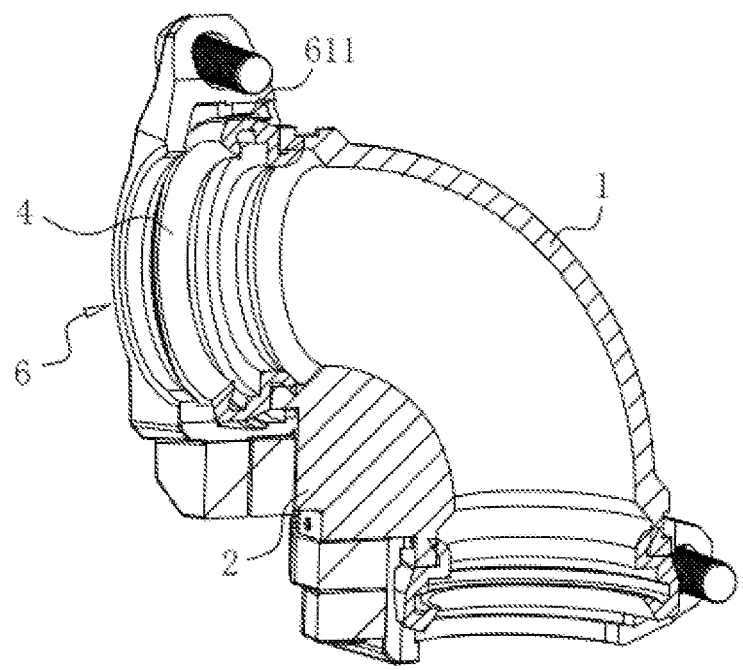
FIG. 34 is a section view of Embodiment 4 according to the present application, wherein the sealing ring includes an outer seal and an end seal.

FIG. 34 illustrates a situation, in which the sealing ring 4 includes an outer seal and an end seal.

Figure 35:
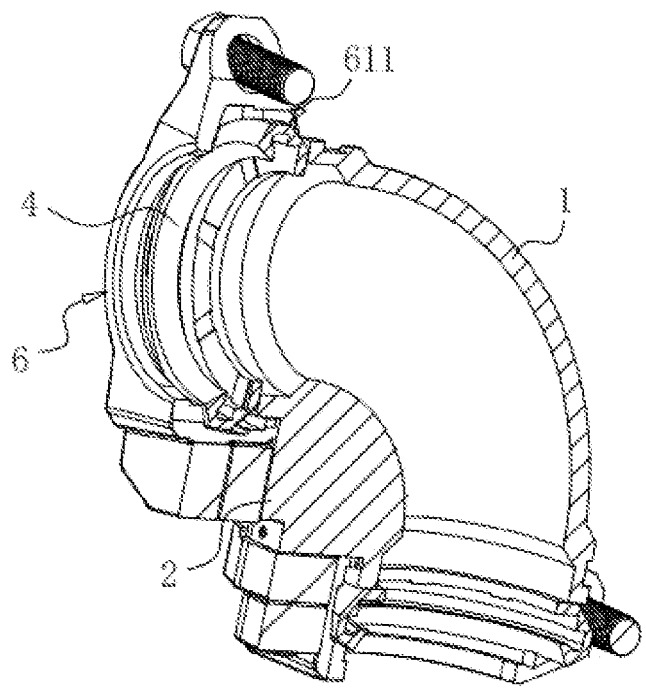
FIG. 35 is a section view of Embodiment 4 according to the present application, wherein the sealing ring includes an outer seal and an inner seal.

FIG. 35 illustrates a situation, in which the sealing ring 4 includes an end seal and an inner seal.

The sealing ring 4 of the present embodiment can have the configuration of other sealing rings 4 in Embodiment 1.

The implementation principle of a quick-fitting pipe fitting in the embodiment of the present application is: the rotational connection between the first movable clamp part 65 and the second movable clamp part 66 is achieved by double hinges, and a quick installation of the pipe fitting can be realized by one fastener 3. In the installation process, the two movable clamp parts are fastened by the fastener 3, meanwhile the movable clamp parts are deformed and gradually fit the first joint peripheral face 51 and the second joint peripheral face 11, so as to realize the tight connection of the movable clamp parts and the pipeline element 5 and the pipe fitting body 1.

Embodiment 5

Figure 36:
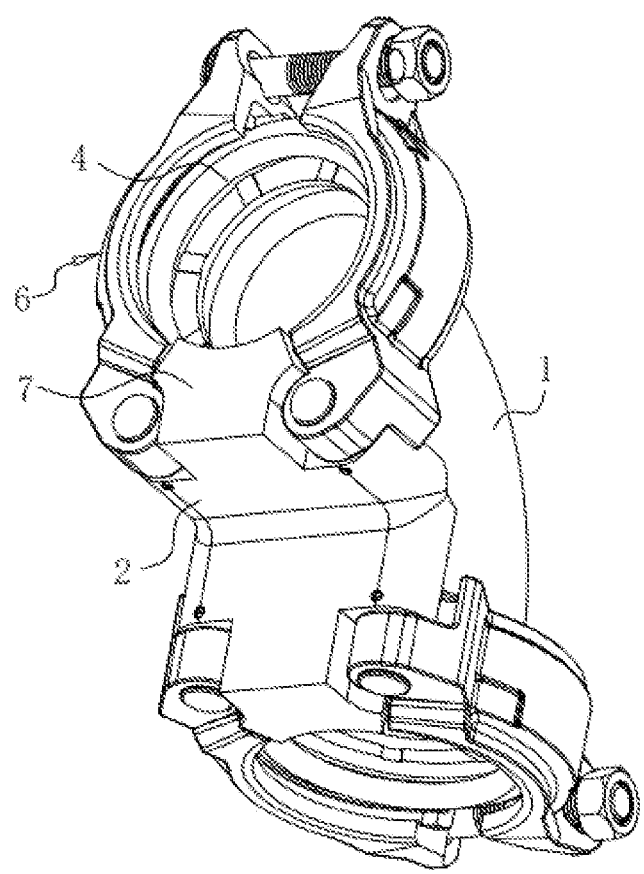
FIG. 36 is an overall structure diagram of Embodiment 5 according to the present application.
Figure 37:
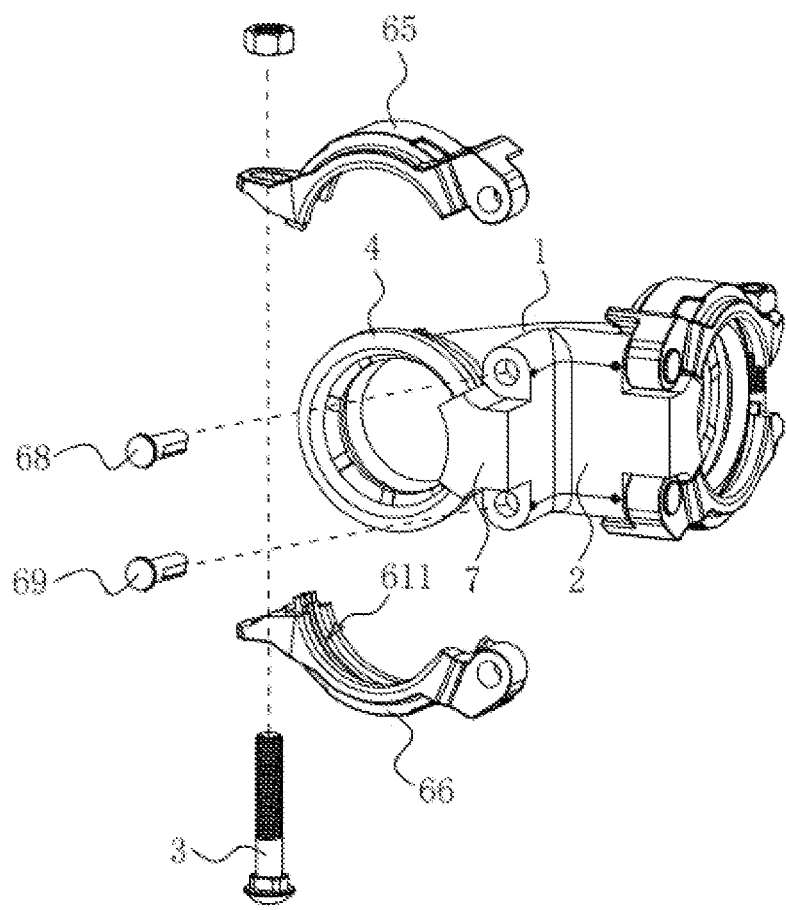
FIG. 37 is an exploded diagram of partial structure of Embodiment 5 according to the present application.
Figure 38:
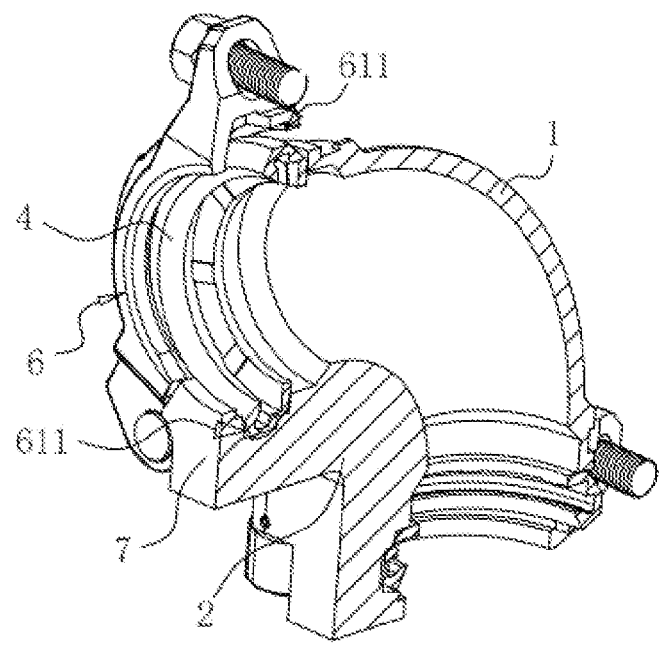
FIG. 38 is a section view of Embodiment 5 according to the present application, wherein the sealing ring includes an outer seal and an end seal.

Embodiment 5 of the present application discloses a quick-fitting pipe fitting, referring to FIG. 36, FIG. 37 and FIG. 38, which has a substantially same structure as that of Embodiment 1, the difference is the connection structure of the first movable clamp part 65 and the second movable clamp part 66 on the pre-installation section 2: The pre-installation section 2 is integrally formed on the outer wall of the pipe fitting body 1, an abutment fastener 7 extends integrally the pre-installation section 2 for engagement with the pipeline element 5. The abutment fastener 7 has the same inner cavity 611 as the first movable clamp part 65 and the second movable clamp part 66. The abutment fastener 7 is integrally formed with a stationary engagement key, the stationary engagement key has a engagement face with a fixed curvature. The first movable clamp part 65 is hinged at one end of the abutment fastener 7 by the second hinge pin 68, the second hinge pin 68 is fixedly mounted on the abutment fastener 7; the second movable clamp part 66 is hinged at the other symmetrical end of the abutment fastener 7 by the third hinge pin 69, the third hinge pin 69 is fixedly mounted on the abutment fastener 7.

FIG. 38 illustrates a situation, in which the sealing ring 4 includes an outer seal and an end seal.

Figure 39:
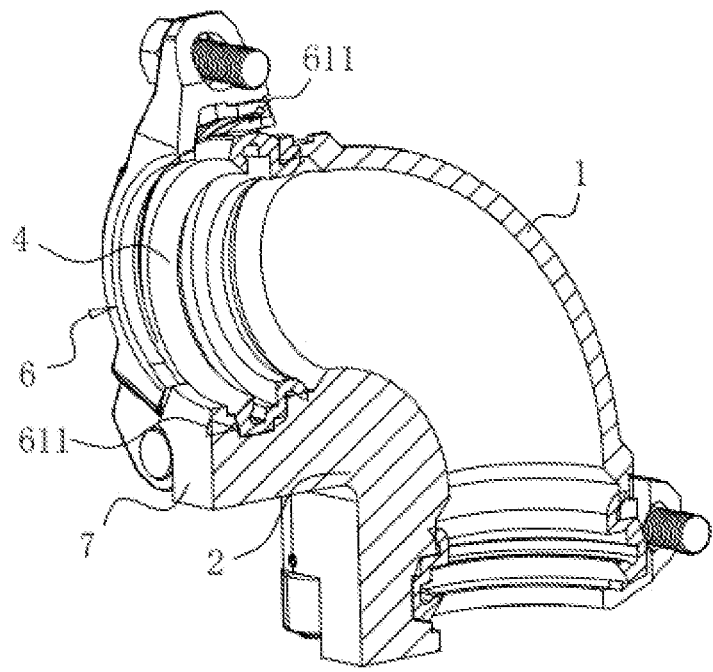
FIG. 39 is a section view of Embodiment 5 according to the present application, wherein the sealing ring includes an outer seal and an inner seal.

FIG. 39 illustrates a situation, in which the sealing ring 4 includes an end seal and an inner seal.

The sealing ring 4 of the present embodiment can have the configuration of other sealing rings 4 in Embodiment 1.

The implementation principle of a quick-fitting pipe fitting in the embodiment of the present application is: the first movable clamp part 65, the second movable clamp part 66 and the abutment fastener 7 constitute a three-pieces clamp structure and are assembled by a fastener 3. The structure is easy to assembly, thereby realizing a high efficiency. Moreover, the complex structural design, in which two pieces of movable clamp parts are directly hinged connected, is reduced, which is beneficial to simplifying production steps and improving production efficiency. And in the installation process, the two movable clamp parts are fastened by the fastener 3, meanwhile the movable clamp parts are deformed and gradually fit the first joint peripheral face 51 and the second joint peripheral face 11, so as to realize the tight connection of the movable clamp parts an the pipeline element 5 and the pipe fitting body 1.

The above are the preferred embodiments of this application, which are not to limit the protection scope of this application. Therefore, all equivalent changes made according to the structure, shape and principle of this application should be covered by the protection scope of this application.

What is claimed is:

1. A quick-fitting pipe fitting for connecting at least one pipeline element, comprising a pipe fitting body, the pipe fitting body is configured with a pre-installation section, the pre-installation section is movably connected with a pipe clamp assembly, the pipe clamp assembly comprises at least two movable clamp parts and at least one fastener, the at least one fastener is configured to be operated to fasten the at least two movable clamp parts; at least one sealing ring is arranged in the pipe clamp assembly, wherein each of the at least two movable clamp parts comprises a first movable engagement key and a second movable engagement key, the first movable engagement key has a first movable engagement face configured to engage with a first joint peripheral face of a first coupling end of the at least one pipeline element, and the second movable engagement key has a second movable engagement face in engagement with a second joint peripheral face of a second coupling end of the pipe fitting body, wherein the pipe clamp assembly comprises a first movable clamp part and a second movable clamp part and one of the at least one fastener, the first movable clamp part and the second movable clamp part are rotationally connected to the pre-installation section, the one of the at least one fastener is arranged at ends of both the first movable clamp part and the second movable clamp part away from the pre-installation section.

2. The quick-fitting pipe fitting according to claim 1, wherein the pre-installation section comprises a detachably connected intermediate block, the first movable clamp part and the second movable clamp part are rotationally connected to the detachably connected intermediate block.

3. The quick-fitting pipe fitting according to claim 2, wherein each of the at least two movable clamp parts is configured with an inner cavity, an end of the pipe fitting body has an inner wall end, the at least one sealing ring comprises a base accommodated in the inner cavity, an outer offset section extending at one end of the base and being configured to abut against an outer wall of an end of the at least one pipeline element, and an inner offset section extending at a second end of the base and being configured to abut against an inner wall of the end of the pipe fitting body.

4. The quick-fitting pipe fitting according to claim 3, wherein a first sealing element is arranged between an outer wall of the end of the pipe fitting body and each of the at least two movable clamp parts, the first sealing element is located at a side of the at least one sealing ring away from the at least one pipeline element; a second sealing element is arranged between the at least one pipeline element and each of the at least two movable clamp parts; the second sealing element has two configurations: in a first configuration, the second sealing element is located at a side of the at least one sealing ring away from the pipe fitting body; in a second configuration, the second sealing element is integrally formed at a side of the outer offset section away from the inner offset section, forming an extension end.

5. The quick-fitting pipe fitting according to claim 3, wherein the pipe fitting body is configured as an elbow, a tee, a cross, a reducer, a pipe blind and a water pipe.

6. The quick-fitting pipe fitting according to claim 2, wherein each of the at least two movable clamp parts is configured with an inner cavity, an end of the pipe fitting body has an abutment end face; the at least one sealing ring comprises a base accommodated in the inner cavity, an outer offset section extending at one end of the base and being configured to abut against an outer wall of an end of the at least one pipeline element, and an end face occlusion section extending integrally at a second end of the base and being configured to abut between an end face of the at least one pipeline element and the abutment end face of the pipe fitting body.

7. The quick-fitting pipe fitting according to claim 6, wherein a third sealing element is arranged between an outer wall of the end of the pipe fitting body and each of the at least two movable clamp parts, a fourth sealing element is arranged between the at least one pipeline element and each of the at least two movable clamp parts, the fourth sealing element has two configurations: in a first configuration, the fourth sealing element is arranged at a side of the at least one sealing ring away from the pipe fitting body, in a second configuration, the fourth sealing element is integrally formed at a side of the outer offset section away from the end face occlusion section, forming an extension end.

8. The quick-fitting pipe fitting according to claim 6, wherein an abutment face of the end face occlusion section configured to abut against the end face of the at least one pipeline element is an arc surface.

9. The quick-fitting pipe fitting according to claim 6, wherein an abutment face of the end face occlusion section abutting against the end face of the at least one pipeline element is configured with at least one sealing crimping block.

10. The quick-fitting pipe fitting according to claim 1, wherein the first movable clamp part and the second movable clamp part are rotationally connected on the pre-installation section by a first hinge pin.

11. The quick-fitting pipe fitting according to claim 10, wherein each of the at least two movable clamp parts is configured with an inner cavity, an end of the pipe fitting body has an inner wall end, the at least one sealing ring comprises a base accommodated in the inner cavity, an outer offset section extending at one end of the base and being configured to abut against an outer wall of an end of the at least one pipeline element, and an inner offset section extending at a second end of the base and being configured to abut against an inner wall of the end of the pipe fitting body.

12. The quick-fitting pipe fitting according to claim 10, wherein each of the at least two movable clamp parts is configured with an inner cavity, an end of the pipe fitting body has an abutment end face; the at least one sealing ring comprises a base accommodated in the inner cavity, an outer offset section extending at one end of the base and being configured to abut against an outer wall of an end of the at least one pipeline element, and an end face occlusion section extending integrally at a second end of the base and being configured to abut between an end face of the at least one pipeline element and the abutment end face of the pipe fitting body.

13. The quick-fitting pipe fitting according to claim 1, wherein the first movable clamp part is rotationally connected to the pre-installation section by a second hinge pin, while the second movable clamp part is rotationally connected to the pre-installation section by a third hinge pin.

14. The quick-fitting pipe fitting according to claim 13, wherein the first movable clamp part is configured with a relief hole for the third hinge pin to pass through and for the first movable clamp part to rotate freely.

15. The quick-fitting pipe fitting according to claim 13, wherein the pre-installation section also comprises an abutment fastener for engagement with the at least one pipeline element, the abutment fastener is configured with an engagement face with a fixed curvature, the second hinge pin and the third hinge pin are respectively arranged at two ends of the abutment fastener.

16. The quick-fitting pipe fitting according to claim 13, wherein each of the at least two movable clamp parts is configured with an inner cavity, an end of the pipe fitting body has an inner wall end, the at least one sealing ring comprises a base accommodated in the inner cavity, an outer offset section extending at one end of the base and being configured to abut against an outer wall of an end of the at least one pipeline element, and an inner offset section extending at a second end of the base and being configured to abut against an inner wall of the end of the pipe fitting body.

17. The quick-fitting pipe fitting according to claim 13, wherein each of the at least two movable clamp parts is configured with an inner cavity, an end of the pipe fitting body has an abutment end face; the at least one sealing ring comprises a base accommodated in the inner cavity, an outer offset section extending at one end of the base and being configured to abut against an outer wall of an end of the at least one pipeline element, and an end face occlusion section extending integrally at a second end of the base and being configured to abut between an end face of the at least one pipeline element and the abutment end face of the pipe fitting body.

18. The quick-fitting pipe fitting according to claim 1, wherein the pipe fitting body is configured as an elbow, a tee, a cross, a reducer, a pipe blind and a water pipe.

* * * * *